US012809180B2

(12) United States Patent
Sato et al.

(10) Patent No.: US 12,809,180 B2
(45) Date of Patent: Nov. 24, 2026

(54) PROJECTION SYSTEM AND VIEWING ASSIST DEVICE

(71) Applicant: DAI NIPPON PRINTING CO., LTD., Tokyo (JP)

(72) Inventors: Tomoe Sato, Tokyo (JP); Makio Kurashige, Tokyo (JP); Shumpei Nishio, Tokyo (JP); Kazutoshi Ishida, Tokyo (JP); Kaori Nakatsugawa, Tokyo (JP); Hajime Seino, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 89 days.

(21) Appl. No.: 18/859,720

(22) PCT Filed: Apr. 27, 2023

(86) PCT No.: PCT/JP2023/016755
§ 371 (c)(1),
(2) Date: Oct. 24, 2024

(87) PCT Pub. No.: WO2023/210779
PCT Pub. Date: Nov. 2, 2023

(65) Prior Publication Data
US 2025/0258377 A1 Aug. 14, 2025

(30) Foreign Application Priority Data
Apr. 27, 2022 (JP) ................................ 2022-073865

(51) Int. Cl.
*G02B 27/01* (2006.01)
*B60K 35/20* (2024.01)

(52) U.S. Cl.
CPC ..... *G02B 27/0172* (2013.01); *G02B 27/0101* (2013.01); *B60K 35/20* (2024.01);
(Continued)

(58) Field of Classification Search
CPC .................. G02B 27/01; G02B 27/017; G02B 27/0101; G02B 27/0105; G02B 27/0172;
(Continued)

(56) References Cited

U.S. PATENT DOCUMENTS

| | | | |
|---|---|---|---|
| 6,428,169 | B1 | 8/2002 | Deter et al. |
| 2006/0158725 | A1 | 7/2006 | Yamamoto et al. |

(Continued)

FOREIGN PATENT DOCUMENTS

| | | | |
|---|---|---|---|
| CN | 202275258 | U | 6/2012 |
| CN | 112449164 | A | 3/2021 |

(Continued)

OTHER PUBLICATIONS

English machine translation of the International Preliminary Report on Patentability dated Oct. 29, 2024 for the PCT Application No. PCT/JP2023/016755.

(Continued)

*Primary Examiner* — Sultan Chowdhury
(74) *Attorney, Agent, or Firm* — Michael Best & Friedrich LLP

(57) ABSTRACT

A projection system includes an illuminating device and an optical filter. The illuminating device emits illuminating light. The illuminating device projects a projected pattern onto a surface of projection. An average transmittance of the optical filter in a wavelength region of the illuminating light emitted from the illuminating device is higher than an average transmittance of the optical filter in a visible light wavelength region other than the wavelength region of the illuminating light.

20 Claims, 22 Drawing Sheets

(52) U.S. Cl.
CPC ..................... *B60K 2360/25* (2024.01); *G02B 2027/0141* (2013.01); *G02B 2027/0178* (2013.01)

(58) Field of Classification Search
CPC ........ G02B 27/0178; G02B 5/00; G02B 5/30; G02B 5/3083; G02B 2027/0141; G02B 2027/0154; G02B 2027/178; G03B 21/00; G03B 21/02; G03B 21/142; G03B 21/145; G03B 21/2013; G03B 21/2033; G03B 21/2053; G03B 21/2073; G09G 3/001; G09G 3/003; G09G 3/19; G09G 3/2003; B60K 2360/00; B60K 2360/25; B60K 2360/27; B60K 2360/31
See application file for complete search history.

(56) References Cited

U.S. PATENT DOCUMENTS

| | | | | |
|---|---|---|---|---|
| 2009/0153962 | A1* | 6/2009 | Okada | G02B 27/0101 359/485.02 |
| 2009/0168026 | A1 | 7/2009 | Chen | |
| 2010/0188489 | A1* | 7/2010 | Mashitani | H04N 13/363 359/464 |
| 2018/0210217 | A1* | 7/2018 | Lippey | G02B 5/285 |
| 2019/0346604 | A1 | 11/2019 | Jutamulia et al. | |

FOREIGN PATENT DOCUMENTS

| | | | |
|---|---|---|---|
| JP | 2008-200861 | A | 9/2008 |
| JP | 2008-268878 | A | 11/2008 |
| JP | 2018-508825 | A | 3/2018 |
| JP | 2018-081149 | A | 5/2018 |
| JP | 2019-023757 | A | 2/2019 |
| JP | 2021-052008 | A | 4/2021 |
| JP | 2021-101204 | A | 7/2021 |
| WO | 2004-109390 | A1 | 12/2004 |

OTHER PUBLICATIONS

International Search Report mailed on Jun. 20, 2023 for the corresponding PCT Application No. PCT/JP2023/016755, with English machine translation.
Japanese Office Action dated Aug. 30, 2024 for the corresponding Japanese Patent Application No. JP 2024-518054, with English machine translation.
Indian Office Action dated Sep. 22, 2026 for the corresponding Indian Application No. 202417086771, with English translation.

* cited by examiner

PROJECTION SYSTEM AND VIEWING ASSIST DEVICE

CROSS-REFERENCE TO RELATED APPLICATIONS

This application is entering into the national phase of PCT Application No. PCT/JP2023/016755, filed on Apr. 27, 2023. Further, this application claims the benefit of priority from Japanese Application Number 2022-073865, filed on Apr. 27, 2022, the entire contents of which are incorporated herein by reference.

TECHNICAL FIELD

The present invention relates to a projection system and a viewing assist device.

BACKGROUND ART

There has been known an illuminating device configured to project a projected pattern onto a surface of projection such as a road surface (e.g. JP2021-52008A). Depending on ambient light in an environment in which the illuminating device is used, the projected pattern become so low in contrast that it becomes hard to view the projected pattern.

DISCLOSURE OF INVENTION

The present disclosure has as an object to make it possible to clearly view a projected pattern.

In an embodiment of the present disclosure, there is provided a projection system including an illuminating device configured to emit illuminating light and project a projected pattern onto a surface of projection and an optical filter configured such that an average transmittance of the optical filter in a wavelength region of the illuminating light is higher than an average transmittance of the optical filter in a visible light wavelength region other than the wavelength region of the illuminating light. The wavelength region of the illuminating light is a wavelength region ranging from a wavelength that is 5 nm lower than a peak wavelength of the illuminating light to a wavelength that is 5 nm higher than the peak wavelength. The peak wavelength of the illuminating light is a wavelength at which a maximum radiant flux of the illuminating light is attained.

In an embodiment of the present disclosure, there is provided a first viewing assist device configured to assist viewing of a projected pattern that is projected onto a surface of projection with use of illuminating light emitted from an illuminating device. The first viewing assist device includes an optical filter configured such that an average transmittance of the optical filter in a wavelength region of the illuminating light is higher than an average transmittance of the optical filter in a visible light wavelength region other than the wavelength region of the illuminating light. The wavelength region of the illuminating light is a wavelength region ranging from a wavelength that is 5 nm lower than a peak wavelength of the illuminating light to a wavelength that is 5 nm higher than the peak wavelength. The peak wavelength of the illuminating light is a wavelength at which a maximum radiant flux of the illuminating light is attained.

In an embodiment of the present disclosure, there is provided a second viewing assist device configured to assist viewing of a pattern displayed on a surface. The second viewing assist device includes a display device configured to display an image taken of the surface and a control device electrically connected to the display device. The control device detects the pattern in the image displayed on the display device and generates a display pattern associated with the pattern thus detected. The display device displays the display pattern over the image.

An embodiment of the present disclosure makes it possible to clearly view a projected pattern.

DESCRIPTION OF EMBODIMENTS

Figure 1:
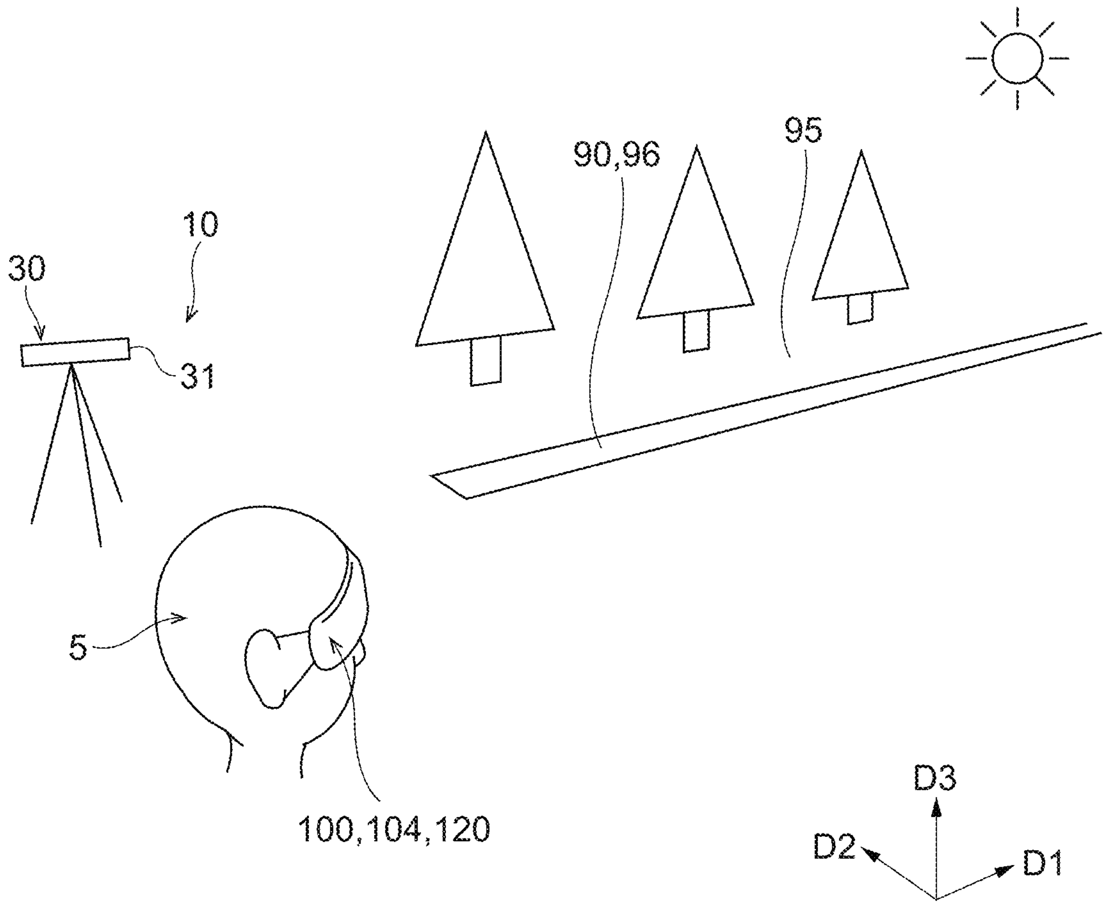
FIG. 1 is a diagram explaining an embodiment and a perspective view showing an example of a projection system and an example of a viewing assist device.

An embodiment of the present disclosure relates to [1] to [40] below.

[1]

A projection system including:

an illuminating device configured to emit illuminating light and project a projected pattern onto a surface of projection; and an optical filter configured such that an average transmittance of the optical filter in a wavelength region of the illuminating light is higher than an average transmittance of the optical filter in a visible light wavelength region other than the wavelength region of the illuminating light, wherein the wavelength region of the illuminating light is a wavelength region ranging from a wavelength that is 5 nm lower than a peak wavelength of the illuminating light to a wavelength that is 5 nm higher than the peak wavelength, and the peak wavelength of the illuminating light is a wavelength at which a maximum radiant flux of the illuminating light is attained.

[2]

The projection system according to [1], wherein the projected pattern is viewed via the optical filter.

[3]

The projection system according to [1] or [2], further including a wearable tool that a viewer of the projected pattern is able to wear, wherein the wearable tool includes the optical filter, and in a state where the viewer is wearing the wearable tool, the optical filter faces eyes of the viewer.

[4]

The projection system according to [3], wherein the wearable tool includes a light-shielding wall portion located around the optical filter, and in a state where the viewer is wearing the wearable tool, the light-shielding wall portion is located between the optical filter and the viewer.

[5]

The projection system according to [3] or [4], wherein the wearable tool includes a wearable tool body that is worn on a head, and the optical filter is detachable from the wearable tool body.

[6]

The projection system according to [3], wherein the wearable tool includes a contact lens including the optical filter.

[7]

The projection system according to [1] or [2], wherein the optical filter constitutes a windshield of a movable body.

[8]

The projection system according to [1], further including an imaging device including the optical filter.

[9]

The projection system according to [8], further including a display device electrically connected to the imaging device, wherein the display device displays an image taken by the imaging device.

[10]

The projection system according to [9], wherein the display device includes a wearable tool that a viewer is able to wear and a display element held by the wearable tool and configured to display the image, and in a state where the viewer is wearing the wearable tool, the display element faces eyes of the viewer.

[11]

The projection system according to [10], wherein a total transmittance of the display element is 1% or higher.

[12]

The projection system according to any one of [9] to [11], further including a control device electrically connected to the imaging device and the display device, wherein the control device detects the projected pattern in the image displayed on the display device and generates a display pattern associated with the projected pattern thus detected, and the display device displays the display pattern over the image.

[13]

The projection system according to [12], wherein the projected pattern includes a linear pattern, and the display pattern includes a linear auxiliary pattern extending as an extension of the projected pattern.

[14]

The projection system according to [12] or [13], wherein the projected pattern includes a straight linear pattern, and the display pattern includes a straight linear auxiliary pattern located on an extension of the projected pattern.

[15]

The projection system according to [12] or [13], wherein the projected pattern includes a first linear pattern and a second linear pattern that intersect each other, and the display pattern includes a linear first auxiliary pattern located on an extension of the first linear pattern and a linear second auxiliary pattern located on an extension of the second linear pattern.

[16]

The projection system according to [12] or [13], wherein the display pattern includes an auxiliary pattern circumferentially surrounding the projected pattern.

[17]

The projection system according to [16], wherein a center of gravity of a region surrounded by an outer contour of the auxiliary pattern is in a position that is identical to that of at least either a center of gravity of the projected pattern or a center of gravity of a region surrounded by an outer contour of the projected pattern.

[18]

The projection system according to any one of [12] to [17], wherein the display pattern includes a detection pattern overlapping the projected pattern thus detected.

[19]

The projection system according to any one of [12] to [18], wherein the display pattern includes an auxiliary pattern connected to the detection pattern and located on an extension of the detection pattern.

[20]

The projection system according to any one of [9] to [19], wherein the imaging device is able to move relative to the surface of projection, and the display device displays, over the image, a reference pattern indicating a predetermined position, a predetermined direction, or a predetermined range within a range that is imaged by the imaging device.

[21]

The projection system according to [20], further including a movable body that is able to move relative to the surface of projection, wherein the imaging device is held by the movable body.

[22]

The projection system according to [21], wherein the reference pattern indicates at least either a scheduled route of movement of the movable body or a scheduled position of work that is carried out by the movable body.

[23]

The projection system according to any one of [12] to [22], wherein the display device displays, over the image, a reference pattern indicating a predetermined position, a predetermined direction, or a predetermined range within a range that is imaged by the imaging device, the control device evaluates a positional relationship between the reference pattern and at least either the projected pattern thus detected or the display pattern thus generated, and in a case where the control device determines that there is an abnormality in the positional relationship, the abnormality is notified.

[24]

The projection system according to [23], wherein the display device notifies the abnormality by changing at least either a method for displaying the image or a method for displaying the display pattern.

[25]

The projection system according to [23] or [24], further including a notification device configured to notify the abnormality, wherein in a case where the control device determines that there is an abnormality in the positional relationship, the notification device notifies the abnormality using at least either light or sound.

[26]

The projection system according to any one of [23] to [25], wherein the illuminating device notifies the abnormality by changing a method for projecting the projected pattern onto the surface of projection.

[27]

The projection system according to any one of [1] to [26], wherein the optical filter includes a dielectric multilayer film.

[28]

The projection system according to any one of [1] to [27], wherein a full width at half maximum of a spectral transmittance of the optical filter is 15 nm or less.

[29]

The projection system according to any one of [1] to [28], wherein a maximum spectral transmittance of the optical filter in a visible light region is 50% or higher.

[30]

The projection system according to any one of [1] to [29], wherein an average transmittance of the optical filter in a visible light wavelength region other than a wavelength region of 30 nm centered at the peak wavelength of the illuminating light is 1% or lower.

[31]

The projection system according to any one of [1] to [30], wherein an average transmittance of the optical filter in a visible light wavelength region other than a wavelength region of 30 nm centered at the peak wavelength of the illuminating light is 0.001% or higher.

[32]

The projection system according to any one of [1] to [31], wherein a maximum value of an illuminance of the projected pattern projected onto the surface of projection is 1 lx or greater.

[33]

The projection system according to any one of [1] to [32], wherein an illuminance LX (lx) that is a maximum value of an illuminance of the projected pattern projected onto the surface of projection, an illuminance LY (lx) attributed to ambient light at a position on the surface of projection at which the illuminance LX is attained, an average transmittance TX (%) of the optical filter in the wavelength region of the illuminating light, and an average transmittance TY (%) of the optical filter in a visible light wavelength region other than a wavelength region of 30 nm centered at the peak wavelength of the illuminating light satisfy $0.001 \leq (LX \cdot TX)/(LY \cdot TY)$.

[34]

The projection system according to [33], wherein the illuminance LX, the illuminance LY, the transmittance TX, and the transmittance TY satisfy $(LX \cdot TX)/(LY \cdot TY) \leq 10$.

[35]

The projection system according to any one of [1] to [34], wherein the illuminating device includes a light source configured to emit coherent light as the illuminating light and a diffraction optical element configured to diffract the coherent light.

[36]

A viewing assist device configured to assist viewing of a projected pattern that is projected onto a surface of projection with use of illuminating light emitted from an illuminating device, the viewing assist device including an optical filter configured such that an average transmittance of the optical filter in a wavelength region of the illuminating light is higher than an average transmittance of the optical filter in a visible light wavelength region other than the wavelength region of the illuminating light, wherein the wavelength region of the illuminating light is a wavelength region ranging from a wavelength that is 5 nm lower than a peak wavelength of the illuminating light to a wavelength that is 5 nm higher than the peak wavelength, and the peak wavelength of the illuminating light is a wavelength at which a maximum radiant flux of the illuminating light is attained.

[37]

The viewing assist device according to [36], further including a wearable tool that a viewer of the projected pattern is able to wear, wherein the wearable tool includes the optical filter, and in a state where the viewer is wearing the wearable tool, the optical filter faces eyes of the viewer.

[38]

The viewing assist device according to [36] or [37], further including an imaging device including the optical filter.

[39]

A viewing assist device configured to assist viewing of a pattern displayed on a surface, the viewing assist device including:

a display device configured to display an image taken of the surface; and a control device electrically connected to the display device, wherein the control device detects the pattern in the image displayed on the display device and generates a display pattern associated with the pattern thus detected, and the display device displays the display pattern over the image.

[40]

The viewing assist device according to [39], further including an illuminating device configured to project the pattern onto a surface.

In the following, an embodiment of the present disclosure is described with reference to the drawings. In the accompanying drawings, scales and horizontal and vertical dimensional ratios, or other sizes are alterations and exaggerations of actual ones for convenience of illustration and ease of comprehension.

A plurality of upper-limit candidates and a plurality of lower-limit candidate are lined up herein for a range of numerical values. In this description, the range of numerical values may be constituted by a combination of any one of the upper-limit candidates and any one of the lower-limit candidates. Let some thought be given to the following statement: "A parameter B is for example A1 or greater, may be A2 or greater, or may be A3 or greater. The parameter B may be A4 or less, may be A5 or less, or may be A6 or less." In this example, the range of numerical values of the parameter B may be A1 or greater and A4 or less, may be A1 or greater and A5 or less, may be A1 or greater and A6 or less, may be A2 or greater and A4 or less, may be A2 or greater and A5 or less, may be A2 or greater and A6 or less, may be A3 or greater and A4 or less, may be A3 or greater and A5 or less, or may be A3 or greater and A6 or less.

Figure 6:
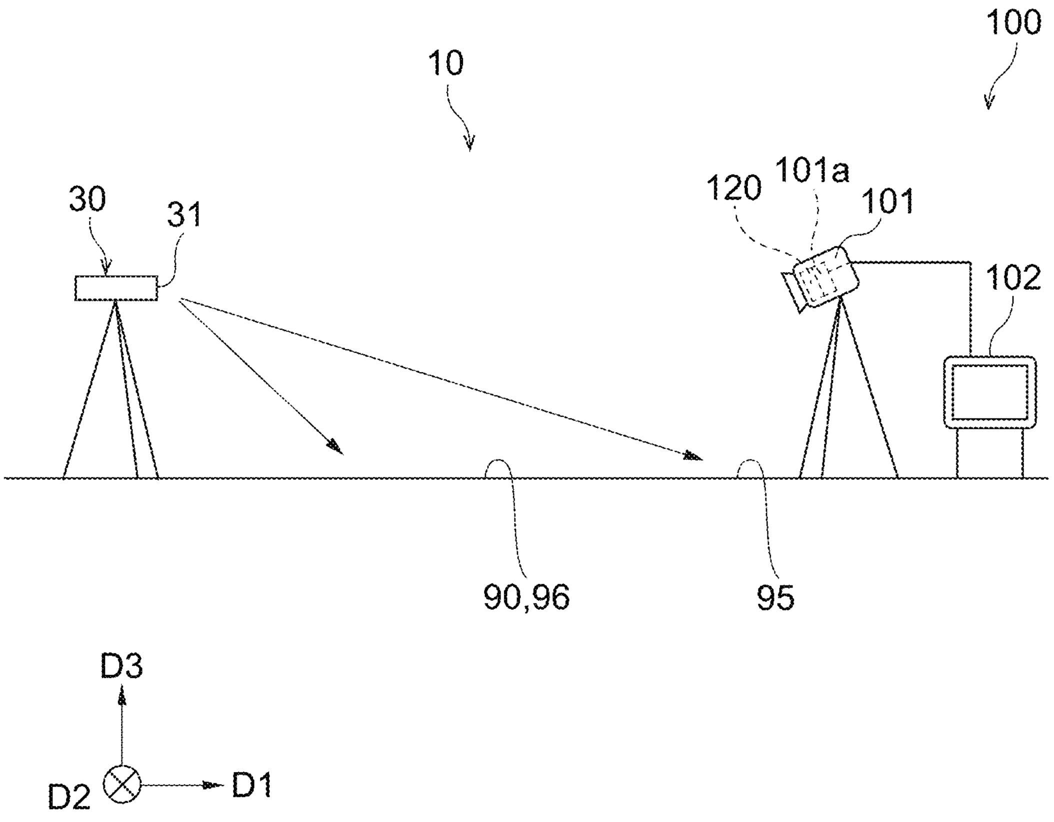
FIG. 6 is a side view showing another example of a projection system and another example of a viewing assist device.
Figure 10:
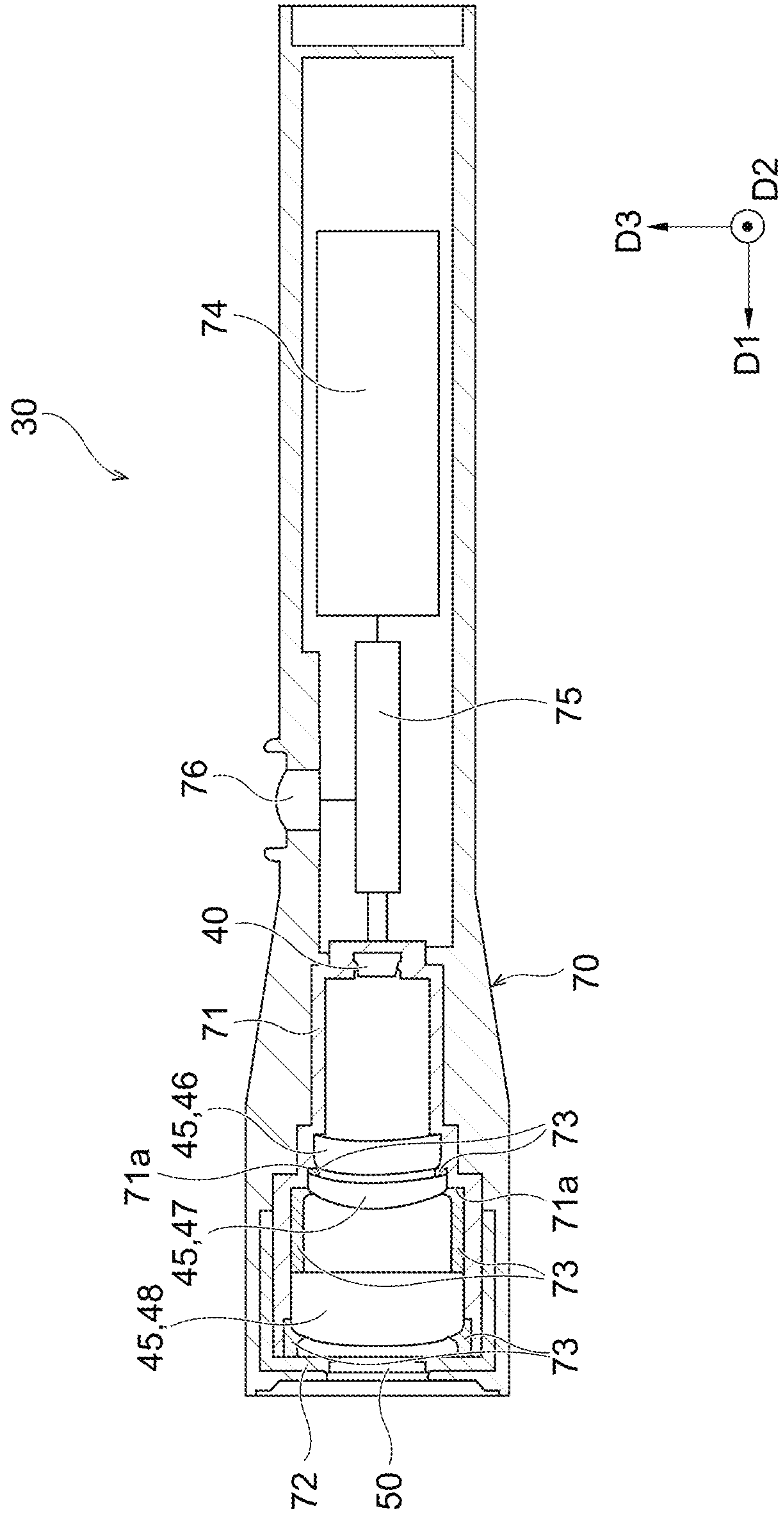
FIG. 10 is a cross-sectional view showing still another example of an illuminating device.

For clarification of directional relationships among drawings, some drawings show a first direction D1, a second direction D2, and a third direction D3 by arrows as directions that are common among the drawings. A first side of each of the directions D1, D2, and D3 is indicated by the head of an arrow. An arrow pointing toward the back of a paper surface of a drawing along a direction perpendicular to the paper surface is indicated by a symbol with an "x" provided in a circle, for example, as shown in FIG. 6. An arrow pointing toward the front of a paper surface of a drawing along a direction perpendicular to the paper surface is indicated by a symbol with a dot provided in a circle, for example, as shown in FIG. 10.

Terms such as "parallel", "orthogonal", and "identical", values of length and angle, or other terms and values that are used herein to specify shapes, geometric conditions, and their extent are not bound by strict meanings but construed as encompassing the extent to which similar functions may be expected.

A projection system 10 according to the present embodiment includes an illuminating device 30 and a viewing assist device 100. The illuminating device 30 projects a projected pattern 90 onto a surface of projection 95. A viewer 5 can view the projected pattern 90 on the surface of projection 95. In the present embodiment, which will be described below, devices are made to make it possible for the viewer 5 to clearly view the projected pattern 90. Specifically, the projection system 10 includes the viewing assist device 100. The viewing assist device 100 includes an optical filter 120. An average transmittance of the optical filter 120 in a wavelength region of illuminating light emitted from the illuminating device 30 is higher than an average transmittance of the optical filter 120 in a visible light wavelength region other than the wavelength region of the illuminating light. Using the optical filter 120 allows the viewer 5 to clearly view the projected pattern 90.

In the following, an embodiment is described with reference to specific examples shown in the drawings.

The illuminating device 30 projects the illuminating light onto an illuminated region 96 of the surface of projection 95. The viewer 5 recognizes the illuminated region 96 as the projected pattern 90. The projected pattern 90 has a shape that is identical to that of the illuminated region 96.

The surface of projection 95 is not limited to particular surfaces of projection that are illuminated with the illuminating light from the illuminating device 30. In particular, according to the present embodiment, the viewing assist device 100 brings about improvement in viewability of the projected pattern 90. Accordingly, the surface of projection 95 may be a surface that is illuminated with sunlight as shown in FIG. 1. Examples of the surface of projection 95 onto which the projected pattern 90 is projected include: a road surface; a ground surface of a sidewalk, a playground, a park, or other places; a water surface such as a sea surface; and an outer wall surface, an inner wall surface, a passage, a floor, a ceiling, or other parts of a building structure such as a school, a company, a building, a factory, an assembly hall, a lecture hall, a gymnasium, a stadium, or a meeting place.

The projected pattern 90 and the illuminated region 96 are not limited to particular patterns and regions. The projected pattern 90 and the illuminated region 96 may include a single region. The projected pattern 90 and the illuminated region 96 may include a plurality of regions that are away from each other. The projected pattern 90 may include any one or more of a letter, a picture, a geometric pattern, a symbol, a mark, an illustration, a character, and a pictogram. The projected pattern 90 may display information.

In the example shown in FIG. 1, the projected pattern 90 and the illuminated region 96 have a linear shape. The projected pattern 90 and the illuminated region 96 are in the shape of a line that extends away from an installation position of the illuminating device 30. The projected pattern 90 and the illuminated region 96 are in the shape of a straight line. The projected pattern 90 and the illuminated region 96 have long sides in the first direction D1. The projected pattern 90 and the illuminated region 96 have short sides in the second direction D2.

The illuminating light that the illuminating device 30 projects onto the surface of projection 95 is in a particular wavelength region. The illuminating light may be coherent light. The coherent light is light having a constant wavelength and a constant phase. The illuminating light may include coherent light of a single wavelength. The illuminating light may be green light of a wavelength of 520 nm. The illuminating light may be green light of a wavelength of 530 nm. The illuminating light may be red light of a wavelength of 635 nm. The illuminating light may be red light of a wavelength of 638 nm. The illuminating light may include coherent light of a plurality of wavelengths. The illuminating light may be visible light.

The viewing assist device 100 includes the optical filter 120. A transmittance of the optical filter 120 has wavelength dependence. The optical filter 120 selectively transmits illuminating light of the visible light that is emitted from the illuminating device 30. The visible light is light having a wavelength that is 380 nm or longer and 780 nm or shorter. More specifically, the average transmittance of the optical filter 120 in the wavelength region of the illuminating light that is emitted from the illuminating device 30 is higher than the average transmittance of the optical filter 120 in the visible light wavelength region other than the wavelength region of the illuminating light.

An average transmittance (%) is defined as an arithmetic mean value of spectral transmittances per 1 nm in a target wavelength region. A spectral transmittance (%) is a transmittance for a wavelength k (nm) in the target wavelength region, and k is a natural number. The wavelength region of the illuminating light is a wavelength region that is defined as ranging from a wavelength that is 5 nm lower than a peak wavelength of the illuminating light to a wavelength that is 5 nm higher than the peak wavelength.

For example, when the peak wavelength is 500 nm, the wavelength region of the illuminating light is a wavelength region ranging from 495 nm to 505 nm. In this example, the "average transmittance in the wavelength region of the illuminating light" is an arithmetic mean value of spectral transmittances (%) for wavelengths of 495 nm, 496 nm, 497 nm, 498 nm, 499 nm, 500 nm, 501 nm, 502 nm, 503 nm, 504 nm, and 505 nm. In this example, the "average transmittance of the optical filter 120 in the visible light wavelength region other than the wavelength region of the illuminating light" is an arithmetic mean value of spectral transmittances (%) measured every 1 nm in a wavelength region ranging from 380 nm to 494 nm and a wavelength region ranging from 506 nm to 780 nm.

The spectral transmittances are measured in compliance with JIS Z 8722:2009. Measurement of the spectral transmittances involves the adoption of a geometric condition e defined in JIS Z8722:2009. The spectral transmittances are measured in a measurement environment with a temperature of 23° C.±2° C. and a relative humidity of 50%±5%. A sample is placed for sixteen hours in the measurement environment before the start of the measurement. A light source is a D65 light source. The light source is kept turned on for fifteen minutes before the start of the measurement so that the light source stabilizes its output.

The peak wavelength of the illuminating light is a wavelength (nm) in a visible light region at which a maximum radiant flux (W) of the illuminating light is attained. The peak wavelength of the illuminating light is defined as a natural number (nm). The peak wavelength is measured with a light spectrum analyzer. The peak wavelength is measured in compliance with a method for measuring a peak oscillation wavelength described in JIS C 5941:1997. Note, however, that the illuminating light to be measured is deemed as light emitted from a rated semiconductor laser. The peak wavelength is measured in a measurement environment with a temperature of 23° C.±2° C., a relative humidity of 50%±5%, and an atmospheric pressure that is 860 hPa or higher and 1060 hPa or lower. The illuminating device is kept turned on for fifteen minutes before the start of the measurement so that the illuminating device stabilizes its output.

As shown in FIGS. 2A to 5, the projection system 10 and the viewing assist device 100 may include a wearable tool 104 that the viewer 5 is able to wear. The wearable tool 104 includes the optical filter 120. In a state where the viewer 5 is wearing the wearable tool 104, the optical filter 120 faces the eyes of the viewer 5. By viewing the projected pattern 90 via the optical filter 120, the viewer 5 can clearly view the projected pattern 90, for example, even in a bright environment.

Figure 2A:
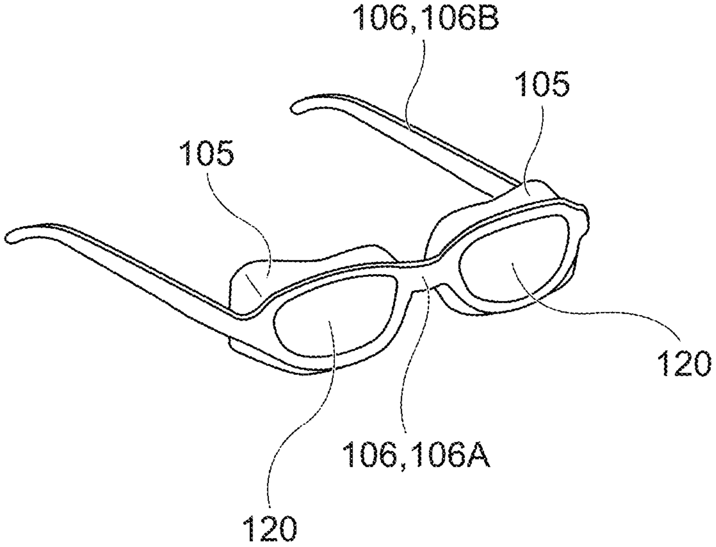
FIG. 2A is a perspective view showing an example of a viewing assist device.
Figure 2B:
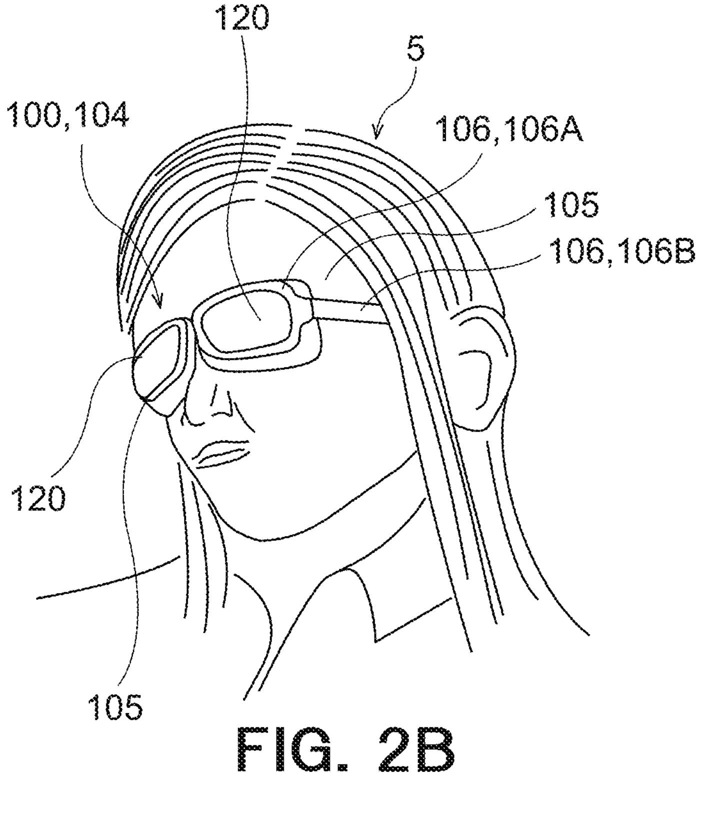
FIG. 2B is a perspective view showing a viewer wearing the viewing assist device shown in FIG. 2A.

As shown in FIG. 2A, the wearable tool 104 may be glasses. The wearable tool 104 may be sunglasses. FIG. 2B shows the viewer 5 wearing the sunglasses of FIG. 2A. As shown in FIGS. 2A and 2B, the wearable tool 104 may include optical filters 120, a frame 106, and light-shielding wall portions 105. In the specific example shown in FIGS. 2A and 2B, the frame 106 holds the optical filters 120. The frame 106 includes a frame body 106A configured to hold the optical filters 120 and holding portions 106B configured to allow the viewer 5 to hold the frame body 106A. As is the case with normal glasses, the frame body 106A holds one optical filter 120 facing the right eye and holds one optical filter 120 facing the left eye. The holding portions 106B are temples. The light-shielding wall portions 105 are located around the optical filters 120. As shown in FIG. 2B, in a state where the viewer 5 is wearing the wearable tool 104, the light-shielding wall portions 105 are located between the optical filters 120 and the viewer 5. The light-shielding wall portions 105 have a visible light-shielding effect. The light-shielding wall portion 105 may have a function of absorbing visible light. The light-shielding wall portions 105 may have a function of reflecting visible light. Providing the light-shielding wall portions 105 makes it possible to restrain ambient light from laterally entering a space between the eyes of the viewer 5 and the optical filters 120.

Figure 2C:
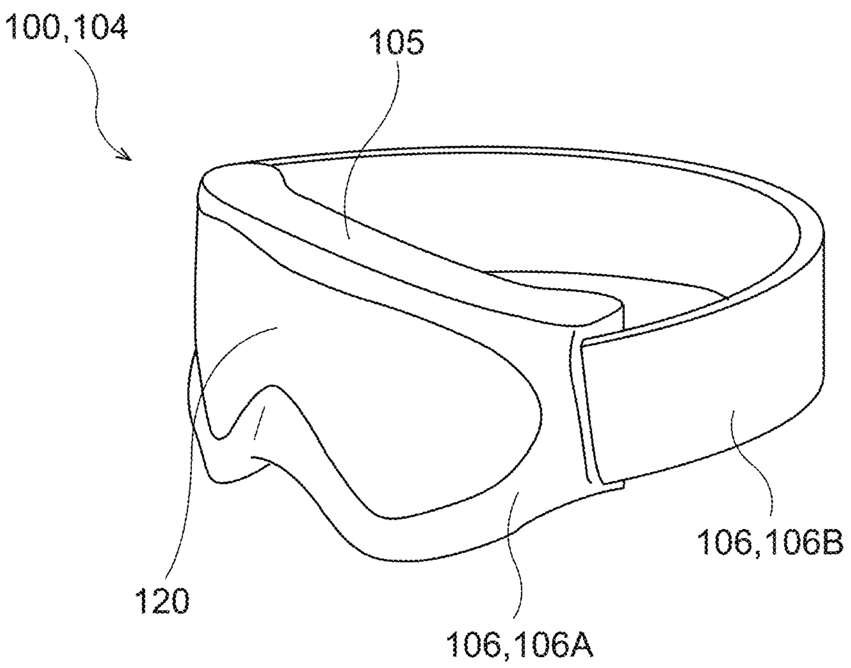
FIG. 2C is a perspective view showing a modification of the viewing assist device shown in FIG. 2A.

FIG. 2C shows another specific example of a wearable tool. As shown in FIG. 2C, the wearable tool 104 may be goggles. The goggles may include a pair of optical filters 120. As shown in FIG. 2C, the goggles may include a single optical filter 120. In the example shown in FIG. 2C, in a state where the viewer 5 is wearing the wearable tool 104, the eyes of the viewer 5 face the single optical filter 120. The wearable tool 104 shown in FIG. 2C includes an optical filter 120 and a frame 106. The frame 106 includes a frame body 106A configured to hold the optical filter 120 and a holding portion 106B configured to fix the frame body 106A to the viewer 5. The holding portion 106B may be a piece of rubber that is held on the head of the viewer 5. The holding portion 106B has a pair of ends connected separately to each end of the frame body 106A. The frame body 106A also serves as a light-shielding wall portion 105. The frame body 106A serving as the light-shielding wall portion 105 is connected to all sides of the optical filter 120. In a state where the viewer is wearing the wearable tool 104, the frame body 106A serving as the light-shielding wall portion 105 is located between the optical filter 120 and the viewer 5. The frame body 106A serving as the light-shielding wall portion 105 can restrain ambient light from laterally entering a space between the optical filter 120 and the viewer 5.

Figure 3A:
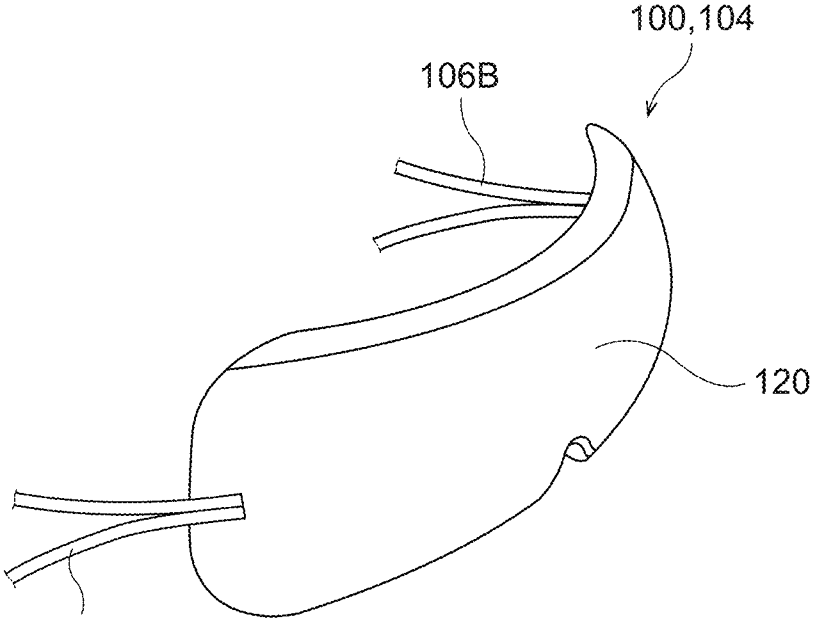
FIG. 3A is a perspective view showing another example of a viewing assist device.
Figure 3B:
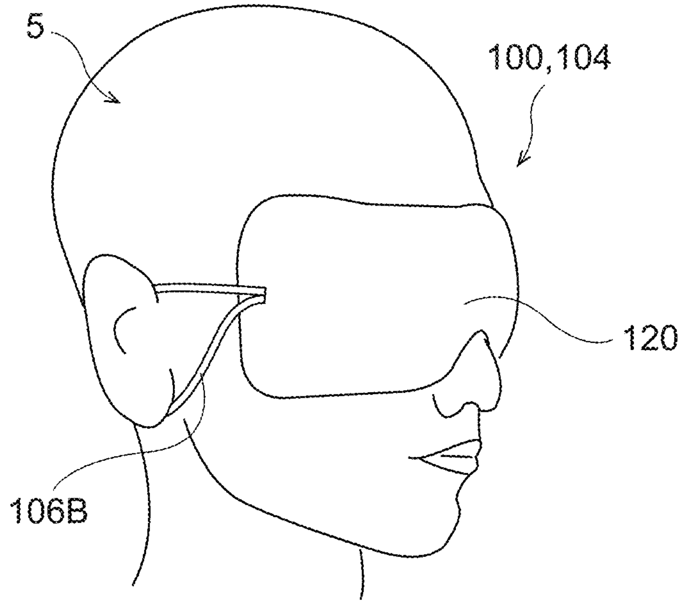
FIG. 3B is a perspective view showing a viewer wearing the viewing assist device shown in FIG. 3A.

As shown in FIGS. 3A and 3B, the wearable tool 104 may be goggles. In the example shown in FIGS. 3A and 3B, an optical filter 120 curved along the face of the viewer 5 is in direct contact with the face of the viewer 5. Holding portions 106B are connected to both ends of the optical filter 120. The pair of holding portions 106B may be pieces of rubber or strings. As shown in FIG. 3B, each holding portion 106B may be hung over an ear on a corresponding side. In the example shown in FIG. 3B, in a state where the wearable tool 104 is worn, a peripheral edge of the optical filter 120 is in contact with the face of the viewer 5. This makes it possible to restrain ambient light from laterally entering a space between the optical filter 120 and the viewer 5.

Figure 4:
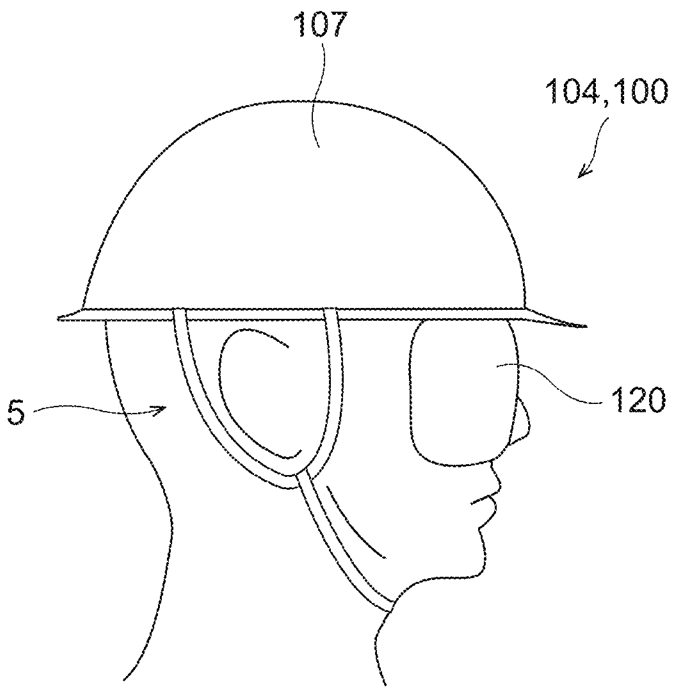
FIG. 4 is a side view showing still another example of a viewing assist device, together with a viewer.

As shown in FIG. 4, the wearable tool 104 includes an optical filter 120 and a wearable tool body 107 that is worn on the head. The wearable tool body 107 may be a helmet. The wearable tool body 107 may be a cap. The optical filter 120 may be goggles. The optical filter 120 is attached to the wearable tool body 107. When the viewer 5 puts the wearable tool body 107 on the head, the optical filter 120 faces in front of the eyes of the viewer 5. In the illustrated example, as in the case of the example of FIG. 3B, a peripheral edge of the optical filter 120 is in contact with the face of the viewer 5. This makes it possible to restrain ambient light from laterally entering a space between the optical filter 120 and the viewer 5. The optical filter 120 may be detachable from the wearable tool body 107.

Figure 5:
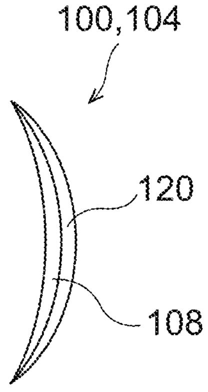
FIG. 5 is a sectional side view showing still another example of a viewing assist device.

As shown in FIG. 5, the wearable tool 104 may be a contact lens. As the contact lens, the wearable tool 104 may include a contact lens body 108 and an optical filter 120 stacked on the contact lens body 108. In a state where the viewer 5 is wearing the contact lens on an eye, the optical filter 120 faces the eye via the contact lens body 108. At this point in time, the contact of the contact lens body 108 with the eye makes it possible to restrain ambient light from laterally entering a space between the optical filter 120 and the viewer 5.

Figure 15:
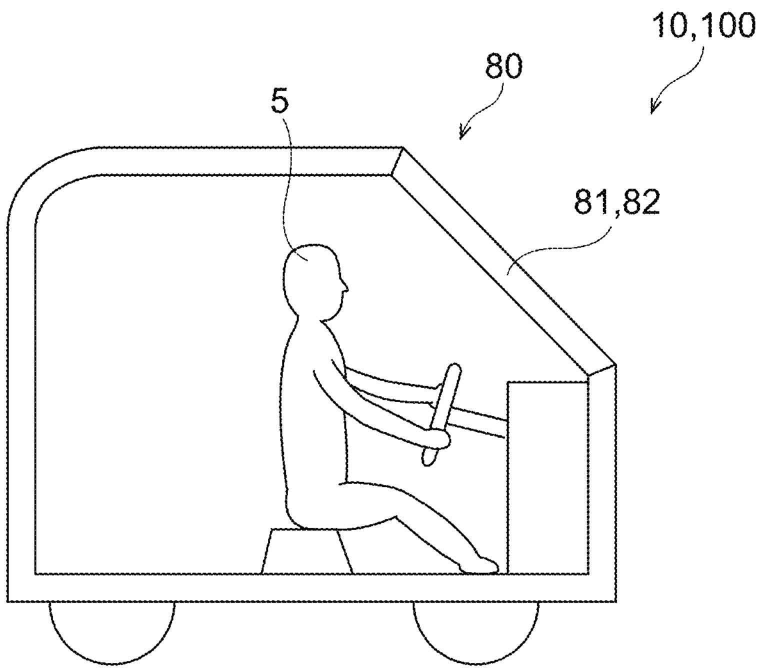
FIG. 15 is a longitudinal sectional view showing an example of a movable body.

As shown in FIG. 15, the optical filter 120 may be included in a windshield 81 of a movable body 80. The movable body 80 is an apparatus that is able to move. The movable body 80 may be an automobile, a train, a ship, an airplane, or a drone. A person may or may not be able to board the movable body 80. The windshield 81 may be installed in an opening such as a window of the movable body 80. The windshield 81 may function as a windbreak. The windshield 81 may be a partitioning member 82 such as a window member that partitions the inside of the movable body 80 from the outside.

The viewer 5 may be able to view the outside of the movable body 80 across the windshield 81. In this example, the viewer 5 can clearly view the projected pattern 90, for example, even in a bright environment. In a case where ambient light is restrained from entering the movable body 80 through another opening or other parts of the movable body 80, the viewer 5 can more clearly view the projected pattern 90. As shown in FIG. 15, the viewer 5 may operate the movable body 80.

As shown in FIG. 6, the projection system 10 and the viewing assist device 100 may include an imaging device 101. The imaging device 101 includes the optical filter 120 and an imaging element 101*a*. Light having passed through the optical filter 120 falls on the imaging element 101*a*. The imaging device 101 images the surface of projection 95 including the illuminated region 96. The viewer 5 views the surface of projection 95 as imaged by the imaging device 101. This allows the viewer 5 to clearly view the projected pattern 90, for example, even in a bright environment As shown in FIG. 6, the projection system 10 and the viewing assist device 100 may include a display device 102 electrically connected to the imaging device 101. The display device 102 displays an image taken by the imaging device 101. The viewer 5 can clearly view the projected pattern 90 as displayed on the display device 102. The display device 102 may be a display device such as a liquid crystal display, a plasma display, an organic EL display, or a projection display device. The display device 102 may include a touch panel sensor configured to function as an input unit.

In a case where work is carried out only by viewing through the display device 102 the surface of projection 95 thus imaged, the illuminating light does not need to be limited to the visible light region. For example, the imaging device 101 may be an infrared camera. The illuminating light may be infrared light. A center wavelength of the optical filter may be in an infrared region.

Figure 16:
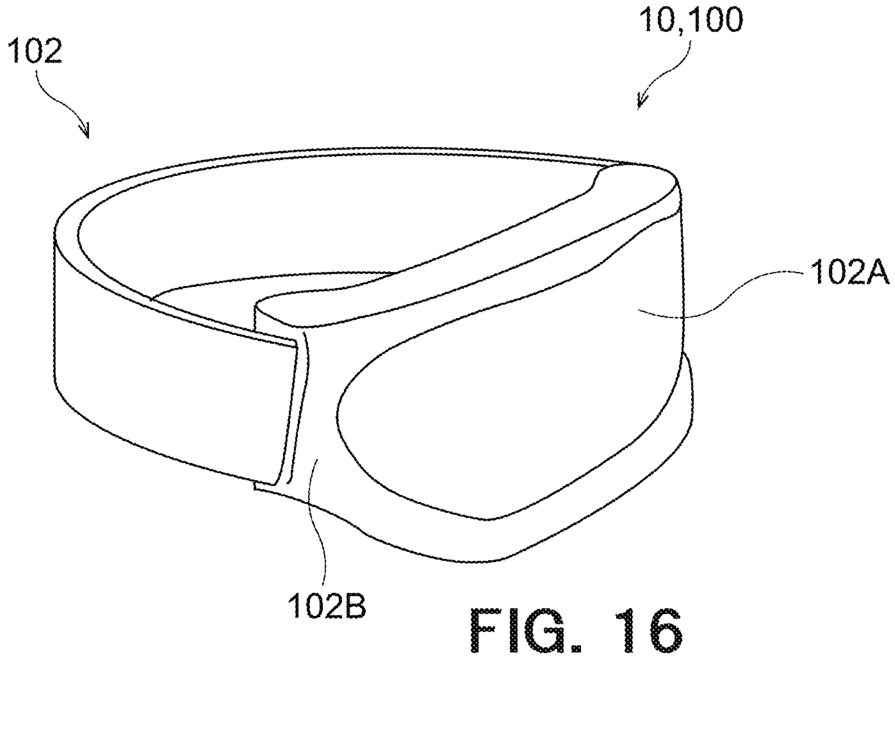
FIG. 16 is a perspective view showing an wearable display device.

As shown in FIG. 16, the display device 102 may include a wearable tool 102B and a display element 102A. The viewer 5 is able to wear the wearable tool 102B. The wearable tool 102B holds the display element 102A. In a state where the viewer 5 is wearing the wearable tool 102B, the display element 102A faces the eyes of the viewer 5. In a state where the viewer 5 is wearing the wearable tool 102B, the viewer 5 can view an image that is displayed on the display element 102A. Such a display device 102 is a wearable display device.

The display device 102 may be VR (virtual reality) glasses, AR (augmented reality) glasses, or a head-mounted display. The wearable display device 102 may enable the viewer 5 to see through the wearable tool 102B. In this example, a total transmittance of the wearable tool 102B may be 1% or higher, may be 10% or higher, may be 30% or higher, may be 50% or higher, may be 60% or higher, may be 70% or higher, or may be 80% or higher.

In a case where work is carried out only by viewing an image from an imaging device or a sensor built in the display device 102, the illuminating light does not need to be limited to the visible light region. For example, in a case where the imaging device or the sensor built in the display device 102 is an infrared camera or an infrared sensor, the illuminating light may be infrared light and a center wavelength of the optical filter may be in an infrared region.

The is no particular upper limit set to the total transmittance of the wearable tool 102B. For example, the total transmittance of the wearable tool 102B may be 100% or lower or may be lower than 100%.

Measurement of the total transmittance (%) involves the use of a D65 light source. The wavelength region of light that is used for the measurement of the total transmittance (%) ranges from 380 nm to 780 nm. The light source is kept turned on for fifteen minutes before the start of the measurement of the total transmittance of the display element 102A so that the light source stabilizes its output. An angle of incidence on a sample during the measurement of the total transmittance is 0 degree. The total transmittance is measured in a measurement environment with a temperature of 23° C.±2° C. and a relative humidity of 50%±5%. The sample is placed for sixteen hours in the measurement environment before the start of the measurement. Other measurement conditions for measuring the total transmittance comply with JIS K7361-1:1997.

Figure 7A:
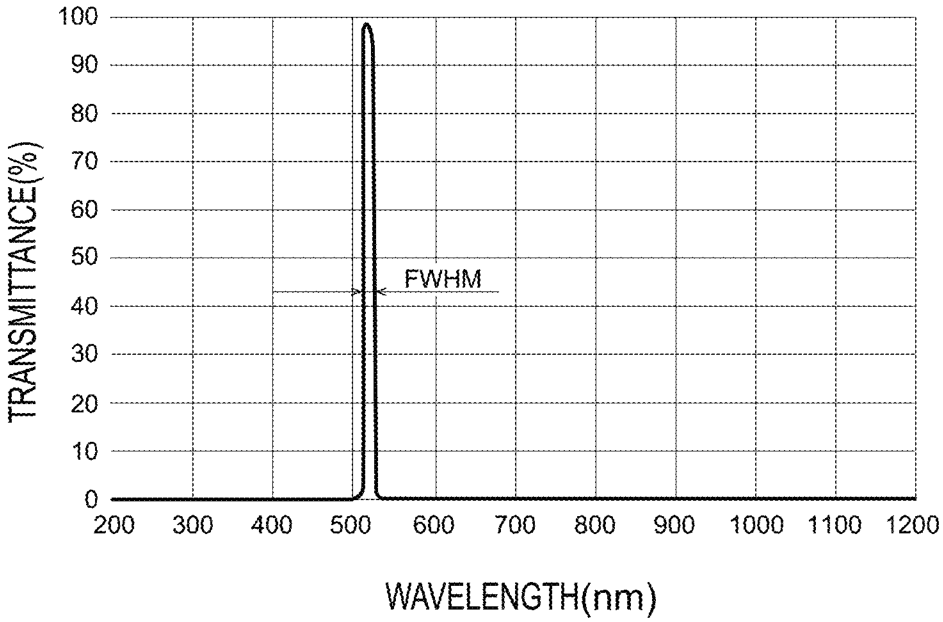
FIG. 7A is a graph showing an example of a transmission spectrum of an optical filter that can be included in a projection system and a viewing assist device.

FIG. 7A shows an example of a transmission spectrum of the optical filter 120 in the visible light region. The optical filter 120 may selectively transmit only the illuminating light that is emitted from the illuminating device 30. In the present embodiment, the average transmittance of the optical filter 120 in a wavelength region of the illuminating light is higher than the average transmittance of the optical filter 120 in the visible light wavelength region other than the wavelength region of the illuminating light. This allows the viewer 5 to clearly view the projected pattern 90 on the surface of projection 95 via the optical filter 120 even if the amount of ambient light such as sunlight that is shone on the surface of projection 95 is large. In expectation of this function of the optical filter 120, the wavelength region of the illuminating light that is emitted from the illuminating device 30 may be sufficiently narrowed. From this aspect, the illuminating light may be coherent light. The illuminating light may be laser light of a particular wavelength.

A lower limit may be set to the average transmittance of the optical filter 120 in the wavelength region of the illuminating light. Setting a lower limit to this average transmittance allows the illuminating light to pass through the optical filter 120 with a high transmittance. The viewer 5 can clearly view the projected pattern 90 via the optical filter 120. The average transmittance of the optical filter 120 in the wavelength region of the illuminating light may be 50% or higher, may be 70% or higher, or may be 80% or higher.

No particular upper limit is set to the average transmittance of the optical filter 120 in the wavelength region of the illuminating light. The average transmittance of the optical filter 120 in the wavelength region of the illuminating light may be 100% or lower or may be lower than 100%. The average transmittance of the optical filter 120 in the wavelength region of the illuminating light may be 50% or higher and 100% or lower.

Similarly, a lower limit may be set to a maximum spectral transmittance of the optical filter 120 in the visible light region. Setting a lower limit to the maximum spectral transmittance allows the illuminating light to pass through the optical filter 120 with a high transmittance. The viewer 5 can clearly view the projected pattern 90 via the optical filter 120. The maximum spectral transmittance of the optical filter 120 in the visible light region may be 50% or higher, may be 70% or higher, or may be 80% or higher. It should be noted that in a case where the illuminating light has a single wavelength, the average transmittance (%) of the optical filter 120 in the wavelength region of the illuminating light and the maximum spectral transmittance (%) of the optical filter 120 in the visible light region may be identical to each other.

No particular upper limit is set to the maximum spectral transmittance of the optical filter 120 in the visible light region. The maximum spectral transmittance of the optical filter 120 in the visible light region may be 100% or lower or may be lower than 100%. The maximum spectral transmittance of the optical filter 120 in the visible light region may be 50% or higher and 100% or lower.

A full width at half maximum FWHM of a spectral transmittance of the optical filter means the width (nm) of a wavelength region in a wavelength distribution of spectral transmittances at which a transmittance half or more than half of a maximum transmittance is attained. An upper limit may be set to the full width at half maximum FWHM of the spectral transmittance of the optical filter. Setting an upper limit to the full width at half maximum FWHM enables the illuminating light in the particular wavelength region to pass intensively through the optical filter 120. In a case where the wavelength region of the illuminating light is narrow, e.g. a case where the illuminating light is coherent light or a case where the illuminating light is laser light, the illuminating light can pass intensively through the optical filter 120. At the same time, ambient light such as sunlight can be restrained from passing through the optical filter 120. This makes it possible to, when viewing the projected pattern 90 via the optical filter 120, emphasize the projected pattern 90 with the ambient light dimmed. This makes it possible to bring about improvement in contrast of the projected pattern 90. This makes it possible to clearly view the projected pattern 90. From this point of view, the full width at half maximum FWHM of the spectral transmittance of the optical filter may be 15 nm or less, may be 3 nm or less, or may be 1 nm or less.

No particular lower limit is set to the full width at half maximum FWHM of the spectral transmittance of the optical filter. The full width at half maximum FWHM of the spectral transmittance of the optical filter may be greater than 0 nm. The full width at half maximum FWHM of the spectral transmittance of the optical filter may be 0 nm or greater and 15 nm or less.

An upper limit may be set to the average transmittance of the optical filter 120 in the visible light wavelength region other than the wavelength region of the illuminating light. Setting an upper limit to this average transmittance makes it possible to restrain ambient light such as sunlight from passing through the optical filter 120. This brings about improvement in contrast of the projected pattern 90, making it possible to clearly view the projected pattern 90. The average transmittance of the optical filter 120 in the visible light wavelength region other than the wavelength region of the illuminating light may be 1% or lower, may be 0.1% or lower, or may be 0.01% or lower.

A lower limit may be set to the average transmittance of the optical filter 120 in the visible light wavelength region other than the wavelength region of the illuminating light. Setting a lower limit to this average transmittance makes it possible to grasp a relative position of the projected pattern 90 with respect to an ambient environment via the optical filter 120 even in a case such as nighttime where the amount of ambient light is small. This makes it possible to, while making the handling of the optical filter 120 the same for both a case where the surface of projection 95 is bright and a case where the surface of projection 95 is dark, clearly view the projected pattern 90 via the optical filter 120 in both of the cases. The average transmittance of the optical filter 120 in the visible light wavelength region other than the wavelength region of the illuminating light may be 0.001% or higher, may be 0.005% or higher, or may be 0.01% or higher.

The average transmittance of the optical filter 120 in the visible light wavelength region other than the wavelength region of the illuminating light may be 0.001% or higher and 1% or lower.

An upper limit may be set to an average transmittance of the optical filter 120 in a visible light wavelength region other than a wavelength region of 30 nm centered at the peak wavelength of the illuminating light. Setting an upper limit to this average transmittance makes it possible to, in a case where the wavelength region of the illuminating light is narrow, e.g. a case where the illuminating light is coherent light or a case where the illuminating light is laser light, restrain ambient light such as sunlight from passing through the optical filter 120 and allow the illuminating light to pass intensively through the optical filter 120. This enables the illuminating light in the particular wavelength region to pass intensively through the optical filter 120. The average transmittance of the optical filter 120 in the visible light wavelength region other than the wavelength region of 30 nm centered at the peak wavelength of the illuminating light may be 1% or lower, may be 0.1% or lower, or may be 0.01% or lower.

A lower limit may be set to the average transmittance of the optical filter 120 in the visible light wavelength region other than the wavelength region of 30 nm centered at the peak wavelength of the illuminating light. Setting a lower limit to this average transmittance makes it possible to grasp the relative position of the projected pattern 90 with respect to the ambient environment via the optical filter 120 even in a case such as nighttime where the amount of ambient light is small. This makes it possible to, while making the handling of the optical filter 120 the same for both a case where the surface of projection 95 is bright and a case where the surface of projection 95 is dark, clearly view the projected pattern 90 via the optical filter 120 in both of the cases. The average transmittance of the optical filter 120 in the visible light wavelength region other than the wavelength region of 30 nm centered at the peak wavelength of the illuminating light may be 0.001% or higher, may be 0.005% or higher, or may be 0.01% or higher.

The average transmittance of the optical filter 120 in the visible light wavelength region other than the wavelength region of 30 nm centered at the peak wavelength of the illuminating light may be 0.001% or higher and 1% or lower.

As mentioned above, in a case where a plurality of upper-limit candidates and a plurality of lower-limit candidate are lined up herein for a range of numerical values such as transmittances, full widths at half maximum, and illuminances, the range of numerical values may be constituted by a combination of any one of the upper-limit candidates and any one of the lower-limit candidates.

The optical filter 120 is not limited to particular optical filters as long as it has wavelength-selective transparency. The optical filter 120 may include a dielectric multilayer film 122. The dielectric multilayer film 122 is superior in being high in the degree of freedom of design of a transmission property.

Figure 7B:
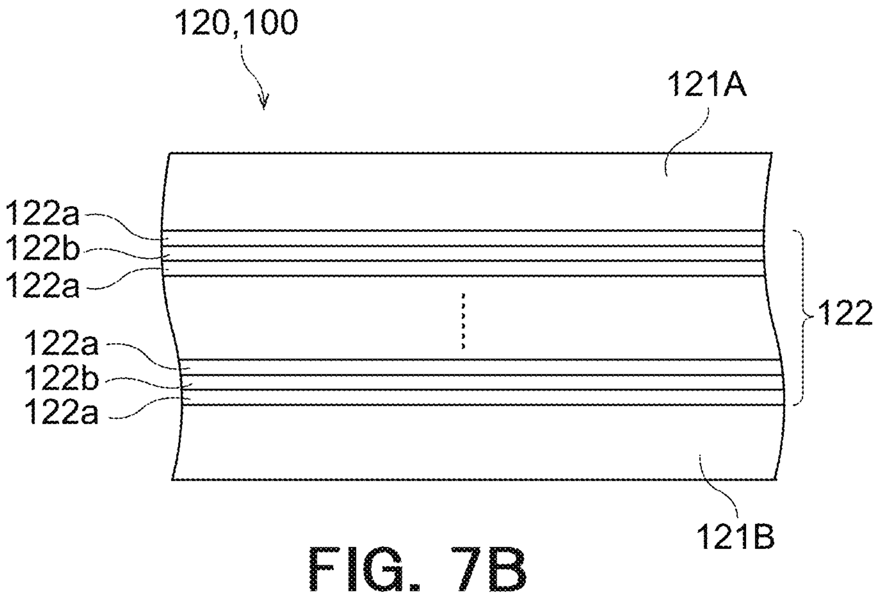
FIG. 7B is a cross-sectional view showing an example of a layer configuration of an optical filter that can be included in a projection system and a viewing assist device.

FIG. 7B is a cross-sectional view showing an example of a layer configuration of an optical filter 120. The optical filter 120 shown in FIG. 7B includes a first protective layer, a second protective layer, and a dielectric multilayer film 122 located between the first protective layer 121A and the second protective layer 121B.

The dielectric multilayer film 122 may include low-refractive-index layers 122*a* and high-refractive-index layers 122*b* that are alternately stacked. The low-refractive-index layers 122*a* and the high-refractive-index layers 122*b* may be inorganic layers containing an inorganic compound. The low-refractive-index layers 122*a* and the high-refractive-index layers 122*b* may be resin layers.

A dielectric multilayer film including inorganic layers is obtained by alternately stacking high-refractive-index organic layers and low-refractive-index organic layers, for example, by a CVD method, a sputtering method, a vacuum deposition method, a wet coating method, or other methods. The thickness of a multilayer film of an inorganic compound may be 0.5 μm or greater and 10 μm or less. The refractive index of an inorganic compound contained in a high-refractive index layer may be 1.7 or higher and 2.5 or lower. Examples of an inorganic compound contained in a high-refractive index layer are composed mainly of titanium oxide, zirconium oxide, tantalum pentoxide, niobium pentoxide, lanthanum oxide, yttrium oxide, zinc oxide, zinc sulfide, or indium oxide and contain a small amount of titanium oxide, tin oxide, cerium oxide, or other substances. The refractive index of an inorganic compound contained in a low-refractive index layer may be 1.2 or higher and 1.6 or lower. Examples of an inorganic compound contained in a low-refractive index layer include silica, alumina, lanthanum fluoride, magnesium fluoride, and aluminum sodium hexafluoride.

A dielectric multilayer film 122 including resin layers may include a large number of layers of thermoplastic resin and thermosetting resin. The resin layers may have added thereto various types of additives such as an antioxidant, an antistatic agent, a crystal nucleating agent, inorganic particles, organic particles, a thinner, a thermal stabilizer, a lubricant, an infrared ray absorbing agent, an ultraviolet ray absorbing agent, a dopant for refractive index adjustment. An in-plane average refractive index difference between a high-refractive-index resin layer having a high refractive index and a low-refractive-index resin layer having a low refractive index may be 0.03 or greater, may be 0.05 or greater, or may be 0.1 or greater.

The number of high-refractive-index resin layers and low-refractive-index resin layers that are stacked is adjusted according to reflection and transmission properties required of the optical filter 120. For example, thirty or more high-refractive-index resin layers and thirty or more low-refractive-index resin layers can be alternately stacked, or two hundred or more high-refractive-index resin layers and two hundred or more low-refractive-index resin layers may be stacked. Further, the total number of high-refractive-index resin layers and low-refractive-index resin layers may, for example, be 600 or larger.

Examples of a method for manufacturing a resin multilayer film that constitutes a dielectric multilayer film include a coextrusion method. Specifically, a method for manufacturing a laminated film described in JP2008200861A can be referred to.

The first protective layer 121A and the second protective layer 121B may contain polyethylene terephthalate or polyethylene naphthalate. The thicknesses of the first protective layer 121A and the second protective layer 121B may be 3 μm or greater or may be 5 μm or greater.

The dielectric multilayer film 122 transmits light of a particular wavelength region and reflects light of a wavelength region other than the particular wavelength region. Light having passed through the optical filter 120 and entered the space between the eyes of the viewer 5 and the optical filter 120 travels toward the eyes of the viewer. Meanwhile, ambient light having laterally entered the space between the eyes of the viewer 5 and the optical filter 120 can fall on a surface of the optical filter 120 that faces the viewer 5 and be reflected with a high reflectance. This reflection causes the surface of the optical filter 120 that faces the viewer 5 to act like a mirror to decrease the viewability of the projected pattern 90. As mentioned above, the entrance of ambient light such as sunlight into the space between the eyes of the viewer 5 and the optical filter 120 may be restrained by the optical filter 120 making contact with the face of the viewer 5. The lateral entrance of ambient light such as sunlight into the space between the eyes of the viewer 5 and the optical filter 120 may be restrained by using the light-shielding wall portion 105. An average transmittance of the light-shielding wall portion 105 in the visible light wavelength region may be 0%.

The following describes workings in which the projection system 10 and the viewing assist device 100 are used.

As shown in FIG. 1, the illuminating device 30 emits the illuminating light. The illuminating light is shone on the illuminated region 96 of the surface of projection 95. The viewer 5 can view the projected pattern 90 on the surface of projection 95. The projected pattern 90 has a shape that is identical to that of the illuminated region 96. The projected pattern 90 may display various types of information.

For example, the projected pattern 90 may show the viewer 5, who performs work, a region on which the work is to be carried out. The worker, who is the viewer 5, can utilize the projected pattern 90 in drawing a white line or an orange line, for example, on a road, a sidewalk, or a parking lot. Without being limited to this example, the projected pattern 90 may display the direction of an arrow or other signs. According to this example, the projected pattern 90 may display a route of movement route or a route of evacuation. Further, the projected pattern 90 may be letters, numbers, or other words or signs. This example makes it possible to present necessary information directly to the viewer 5. Furthermore, the projected pattern 90 may be an advertisement.

Figure 25:
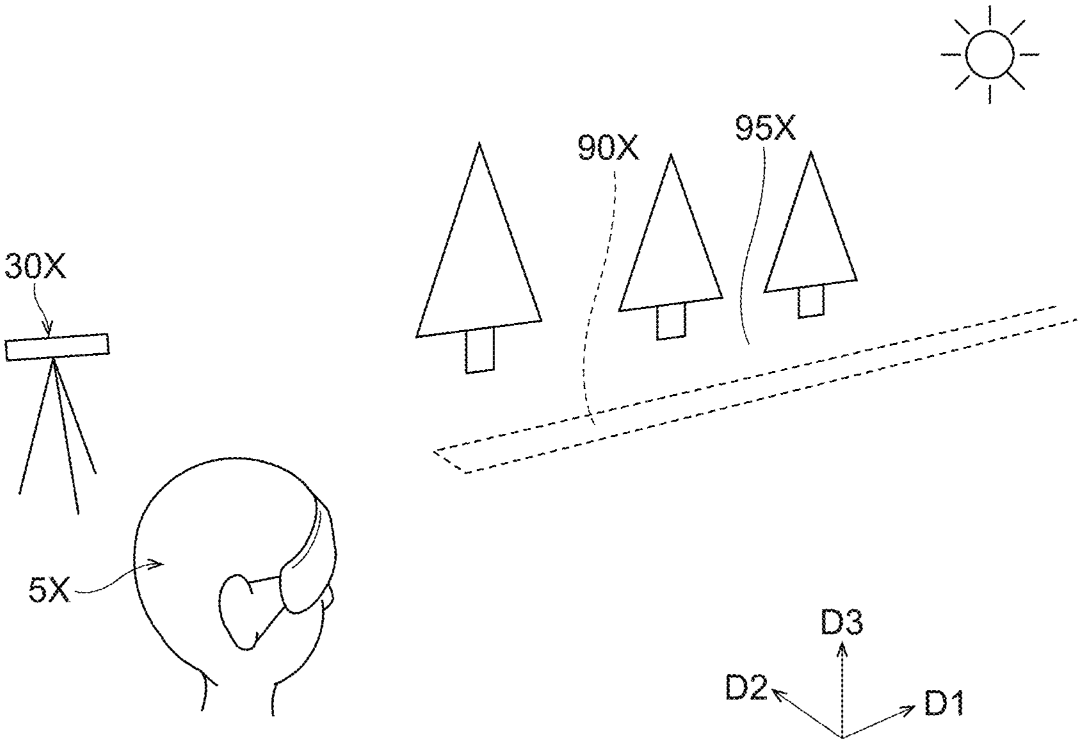
FIG. 25 is a diagram corresponding to FIG. 1 and a perspective view explaining a conventional problem.

Incidentally, depending on ambient light in an environment in which an illuminating device 30X is used, there is a decrease in contrast of a projected pattern 90X. At this point in time, a viewer 5X cannot clearly view the projected pattern 90X on a surface of projection 95X. As shown in FIG. 25, in a case where the amount of ambient light such as sunlight is large, an illuminance (lx) on the surface of projection 95X increases. The contrast of the projected pattern 90X projected onto the surface of projection 95X remarkably decreases. The viewer 5X cannot accurately view the shape of the projected pattern 90X. Furthermore, the viewer 5X cannot even notice the presence of the projected pattern 90X on the surface of projection 95X.

In the present embodiment, a projection system 10 includes a viewing assist device 100 in addition to an illuminating device 30. The viewing assist device 100 includes an optical filter 120. An average transmittance of the optical filter 120 in a wavelength region of illuminating light that is emitted from the illuminating device 30 is higher than an average transmittance of the optical filter 120 in a visible light wavelength region other than the wavelength region of the illuminating light. Viewing a projected pattern 90 via the optical filter 120 makes it possible to reduce the brightness of ambient light while maintaining the brightness of the projected pattern 90. This makes it possible to bring about improvement in contrast of the projected pattern 90 and clearly view the projected pattern 90.

In each of the examples shown in FIGS. 2 to 5, the viewing assist device 100 includes a wearable tool 104. In a state where the viewer 5 is wearing the wearable tool 104, the optical filter 120 faces the eyes of the viewer 5. That is, by wearing the wearable tool 104, the viewer 5 can view the projected pattern 90 and a surface of projection 95 via the optical filter 120. Since the viewer 5 does not need to hold the optical filter 120 with his/her hands, the viewer 5 can freely use both hands while clearly viewing the projected pattern 90. For example, the viewer 5 can stably carry out work or other tasks while clearly viewing the projected pattern 90.

The wearable tool 104 shown in FIGS. 2A to 2C may be glasses, sunglasses, or goggles. The wearable tool 104 illustrated includes a light-shielding wall portion 105 located around the optical filter 120. In a state where the viewer 5 is wearing the wearable tool 104, the light-shielding wall portion 105 is located between the optical filter 120 and the viewer 5. Shielding of the ambient light by the light-shielding wall portion 105 makes it possible to restrain the ambient light from laterally entering the space between the optical filter 120 and the viewer 5. Accordingly, when the optical filter 120 used is of a reflective type, a decrease in viewability of the projected pattern 90 due to the reflection of the ambient light off the optical filter 120 can be restrained.

The wearable tool 104 shown in FIG. 5 is a contact lens. Also in this example, the viewer 5 does not need to hold the optical filter 120 with his/her hands. Accordingly, the viewer 5 can freely use both hands while viewing the projected pattern 90. Further, a contact lens body 108 is located between the optical filter 120 and the eyes of the viewer 5. This makes it possible to restrain incidence and reflection of the ambient light on a surface of the optical filter 120 that faces the eyes of the viewer 5.

In the example shown in FIG. 15, the optical filter 120 constitutes a windshield 81 of a movable body 80. Also in this example, the viewer 5 does not need to hold the optical filter 120 with his/her hands. In the example shown in FIG. 15, the viewer 5 is on board the movable body 80 and is operating the movable body 80.

In the example shown in FIG. 6, the viewing assist device 100 includes an imaging device 101. The imaging device 101 images the projected pattern 90 via the optical filter 120. The imaging device 101 significantly reduces the ambient light through the optical filter 120 and images the projected pattern 90 and an area therearound. Accordingly, using the imaging device 101 makes it possible to clearly view the projected pattern 90. In the example shown in FIG. 6, the viewing assist device 100 includes a display device 102 electrically connected to the imaging device 101. The display device 102 displays an image taken by the imaging device 101, i.e. the projected pattern 90. The display device 102 displays the projected pattern 90 with improvement in contrast. The viewer 5 can clearly view the projected pattern 90 as displayed by the display device 102.

As mentioned above, the average transmittance of the optical filter 120 in the wavelength region of the illuminating light that is emitted from the illuminating device 30 may be 50% or higher, may be 70% or higher, or may be 80% or higher. The maximum transmittance in the visible light region of the optical filter 120 may be 50% or higher, may be 70% or higher, or may be 80% or higher. The wavelength region of the illuminating light that is emitted from the illuminating device 30 may include a wavelength at which the transmittance of the optical filter 120 reaches its maximum. These examples make it possible to maintain the brightness of the projected pattern 90 in viewing the projected pattern 90 via the optical filter 120. This makes it possible to clearly view the projected pattern 90.

The average transmittance of the optical filter 120 in the visible light wavelength region other than the wavelength region of the illuminating light that is emitted from the illuminating device 30 may be 1% or lower, may be 0.1% or lower, or may be 0.01% or lower. The average transmittance of the optical filter 120 in the visible light wavelength region other than the wavelength region of 30 nm centered at the peak wavelength of the illuminating light that is emitted from the illuminating device 30 may be 1% or lower, may be 0.1% or lower, or may be 0.01% or lower. These examples make it possible to restrain ambient light such as sunlight from passing through the optical filter 120. This brings about improvement in contrast of the projected pattern 90, making it possible to clearly view the projected pattern 90.

The full width at half maximum FWHM of the spectral transmittance of the optical filter may be 15 nm or less, may be 3 nm or less, or may be 1 nm or less. This example makes it possible to reduce the ambient light while maintaining the brightness of the projected pattern 90 in viewing the projected pattern 90 via the optical filter 120. This brings about improvement in contrast of the projected pattern 90, making it possible to clearly view the projected pattern 90. The full width at half maximum FWHM of the spectral transmittance of the optical filter may include the whole of the wavelength region of the illuminating light that is emitted from the illuminating device 30.

The average transmittance of the optical filter 120 in the visible light wavelength region other than the wavelength region of the illuminating light that is emitted from the illuminating device 30 may be 0.001% or higher, may be 0.005% or higher, or may be 0.01% or higher. The average transmittance of the optical filter 120 in the visible light wavelength region other than the wavelength region of 30 nm centered at the peak wavelength of the illuminating light that is emitted from the illuminating device 30 may be 0.001% or higher, may be 0.005% or higher, or may be 0.01% or higher. These examples make it possible to grasp a relative position of the projected pattern 90 with respect to an ambient environment via the optical filter 120 even in a case such as nighttime where the amount of ambient light is small. This makes it possible, for example, to, while making the handling of the optical filter 120 the same for both a case where the surface of projection 95 is bright and a case where the surface of projection 95 is dark, clearly view the projected pattern 90 via the optical filter 120 in both of the cases.

A lower limit may be set to a maximum value of an illuminance of the projected pattern 90 projected onto the surface of projection 95. The "illuminance of the projected pattern 90 projected onto the surface of projection 95" here means an illuminance on the surface of projection 95 attributed solely to the illuminating light emitted from the illuminating device 30. Accordingly, a difference between an illuminance that is measured at a certain position on the surface of projection 95 with the projected pattern 90 projected and an illuminance that is measured at the same position on the surface of projection 95 with the projected pattern 90 not projected is the "illuminance of the projected pattern 90 projected onto the surface of projection 95". Setting a lower limit to the maximum value of the illuminance of the projected pattern 90 makes it possible to brightly and clearly view the projected pattern 90. The maximum value of the illuminance of the projected pattern 90 projected onto the surface of projection 95 may be 1 lx or greater, may be 0.1 lx or greater, or may be 0.01 lx or greater.

An upper limit may be set to the maximum value of the illuminance of the projected pattern 90 projected onto the surface of projection 95. Increasing the illuminance of the projected pattern 90 too much hinders effective improvement in viewability of the projected pattern 90, causing deterioration in energy efficiency. From this point of view, the maximum value of the illuminance of the projected pattern 90 projected onto the surface of projection 95 may be 10000 lx or less, may be 1000 lx or less, may be 100 lx or less, or may be 10 lx or less.

Let it be assumed that the maximum value of the illuminance of the projected pattern 90 projected onto the surface of projection 95 is an illuminance LX (lx). Let it also be assumed that an illuminance attributed to ambient light at a position on the surface of projection 95 at which the illuminance LX is attained is an illuminance LY (lx). The illuminance LY is measured on the surface of projection 95 with the projected pattern 90 not projected. Let it be assumed that the average transmittance of the optical filter 120 in the wavelength region of the illuminating light that is emitted from the illuminating device 30 is a transmittance TX (%). Let it also be assumed that the average transmittance of the optical filter 120 in the visible light wavelength region other than the wavelength region of 30 nm centered at the peak wavelength of the illuminating light that is emitted from the illuminating device 30 is a transmittance TY (%). At this point in time, the illuminance LX, the illuminance LY, the transmittance TX, and the transmittance TY may satisfy $0.001 \leq (LX \cdot TX)/(LY \cdot TY)$. This example brings about improvement in contrast of the projected pattern 90, making it possible to clearly view the projected pattern 90. From the point of view of improving the viewability of the projected pattern 90, "$(LX \cdot TX)/(LY \cdot TY)$" may be 0.01 or greater or may be 0.1 or greater.

The illuminance LX, the illuminance LY, the transmittance TX, and the transmittance TY may satisfy $(LX \cdot TX)/(LY \cdot TY) \leq 10$.

This example makes it possible to restrain the area around the projected pattern 90 from becoming too dark. This makes it possible to grasp a relative position of the projected pattern 90 with respect to an ambient environment via the optical filter 120 even in a case where the amount of ambient light is small. This makes it possible, for example, to, while making the handling of the optical filter 120 the same for both a case where the surface of projection 95 is bright and a case where the surface of projection 95 is dark, clearly view the projected pattern 90 via the optical filter 120 in both of the cases.

Let it be assumed that an illuminance is a value measured using a Konica Minolta's spectroradiometer CL-500A in compliance with JIS(JIS C 1609-1:2006). Let it be assumed that wavelengths of measurement range from 380 nm to 780 nm. Intervals between wavelengths of measurement are 1 nm. Measurements are made with an illuminometer placed on the surface of projection 95.

The following describes a specific configuration of the illuminating device 30.

Figure 8:
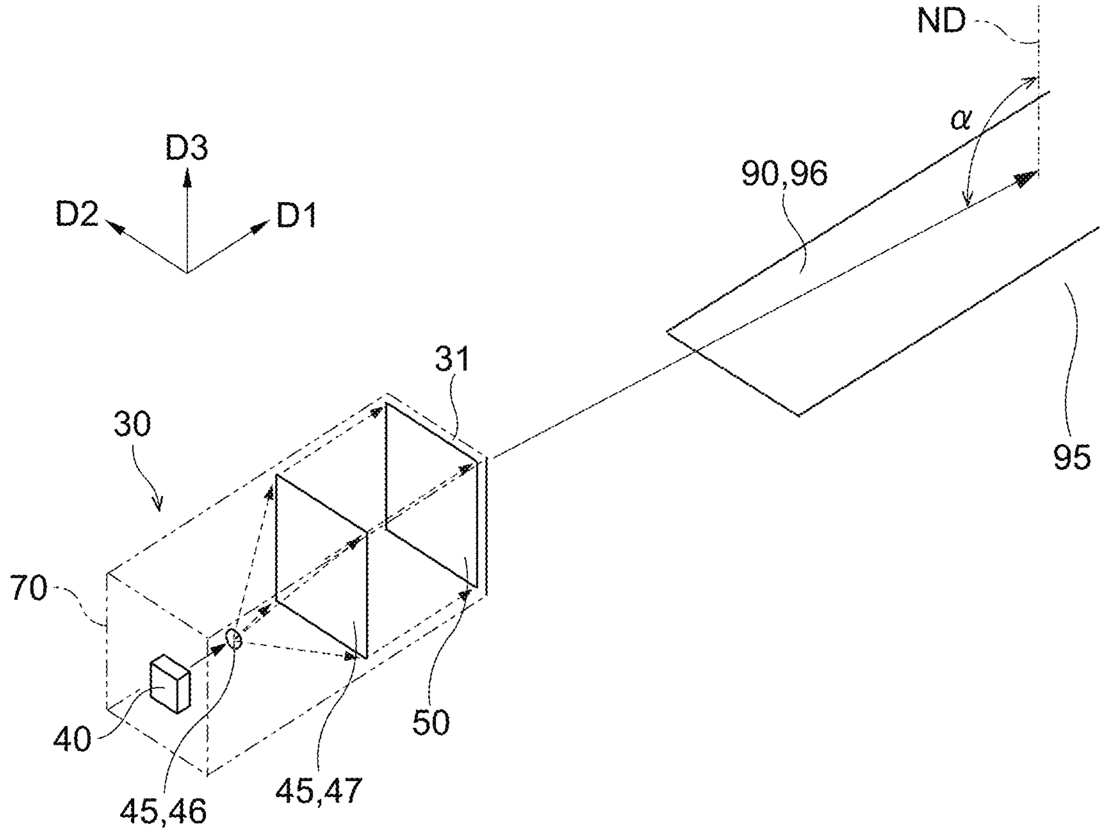
FIG. 8 is a perspective view showing an example of an illuminating device.

As shown in FIG. 8, the illuminating device 30 may include a light source 40, a shaping optical system 45, and a diffraction optical element 50. The light source 40 emits illuminating light. The light source 40 is not limited to particular light sources. The light source 40 may emit coherent light having a constant wavelength and a constant phase. The coherent light that is emitted from the light source 40 is superior in straightness. Accordingly, the light source 40 is suitable to an illuminating device 30 configured to illuminate a distant place. Usable examples of the light source 40 include various types of light source. As the light source 40, a laser light source configured to emit laser light may be used. A possible example of the laser light source is a semiconductor laser light source. In the example shown in FIG. 8, the light source 40 includes a single coherent light source. Accordingly, in the example shown in FIG. 8, the illuminated region 96 is illuminated with color coherent light that corresponds to a wavelength region of the coherent light that is emitted from the light source 40. The following describes an example in which the light source 40 emits coherent light.

The shaping optical system 45 shapes light emitted from the light source 40. For example, the shaping optical system 45 shapes a cross-sectional shape of the illuminating light orthogonal to an optical axis and a steric shape of the illuminating light or the coherent light. The shaping optical system 45 may enlarge the cross-sectional area of the coherent light in a cross-section orthogonal to the optical axis of the coherent light.

In the example shown in FIG. 8, the shaping optical system 45 shapes the light emitted from the light source 40 into a widened parallel pencil. That is, the shaping optical system 45 functions as a collimating optical system. In the example shown in FIG. 8, the shaping optical system 45 has a first lens 46 and a second lens 47 that are arranged along an optical path. The first lens 46 shapes the light emitted from the light source 40 into a divergent pencil of rays. The second lens 47 shapes the divergent pencil of rays generated by the first lend 46 into a parallel pencil. In this example, the second lens 47 functions as a collimating lens.

The diffraction optical element 50 changes the direction of travel of the coherent light from the light source 40. The coherent light diffracted by the diffraction optical element 50 is shone on the illuminated region 96 on the surface of projection 95. The diffraction optical element 50 diffracts the coherent light from the light source 40 and directs it toward the illuminated region 96 on the surface of projection 95. As a result of this, the surface of projection 95 is illuminated with the light diffracted by the diffraction optical element 50. A projected pattern 90 corresponding to a diffraction pattern in the diffraction optical element 50 is projected onto the surface of projection 95.

The diffraction optical element 50 may be a hologram element. Using a hologram element as the diffraction optical element 50 makes it easy to design the diffraction characteristics of the diffraction optical element 50. This makes it possible to comparatively easily design a hologram element that can shine light only on the whole of a desired region on the surface of projection 95 that has a predetermined position, a predetermined contour shape, a predetermined size, and a predetermined orientation. A region on the surface of projection 95 that is illuminated with the coherent light serves as the illuminated region 96.

In designing the diffraction optical element 50, the illuminated region 96 is set in an actual space in a predetermined contour shape, size, and orientation in a predetermined position with respect to the diffraction optical element 50. The position, contour shape, size, and orientation of the illuminated region 96 on the surface of projection 95 depend on the diffraction characteristics of the diffraction optical element 50. The position, contour shape, size, and orientation of the illuminated region 96 on the surface of projection 95 can be arbitrarily adjusted by adjusting the diffraction characteristics of the diffraction optical element 50. Accordingly, in designing the diffraction optical element 50, the position, contour shape, size, and orientation of the illuminated region 96 on the surface of projection 95 are determined first. Then, the diffraction characteristics of the diffraction optical element 50 need only be adjusted so that the whole of the illuminated region 96 thus determined can be illuminated with light.

The diffraction optical element 50 can be fabricated as a computer-generated hologram (CGH). The computer-generated hologram is fabricated by calculating on a computer a structure having given diffraction characteristics. Accordingly, employing the computer-generated hologram as the diffraction optical element 50 can make it unnecessary to generate object light and reference light with use of a light source and an optical system or record interference fringes onto a hologram recording material by performing exposures. The illuminating device 30 is supposed to shine the illuminating light on the illuminated region 96 with a predetermined contour shape, size, and orientation in a predetermined position with respect to the illuminating device 30. By inputting information regarding the illuminated region 96 as parameters into the computer, a structure having such diffraction characteristics as to be able to project diffracted light onto the illuminated region 96, e.g. a corrugated surface, can be identified by computations on the computer. By forming the structure thus identified, for example, by resin shaping, the diffraction optical element 50 can be fabricated as a computer-generated hologram at low cost through a simple procedure.

The diffraction optical element 50 may be designed, for example, by using an iterative Fourier transform method. In a case where the iterative Fourier transform method is used, a process may be performed on the premise that the illuminated region 96 is far away from the diffraction optical element 50, and the projected pattern 90 that is projected onto the surface of projection 95 may be a Fraunhofer diffraction image. Accordingly, the surface of projection 95 may be non-parallel with a diffractive surface of the diffraction optical element 50.

Figure 9:
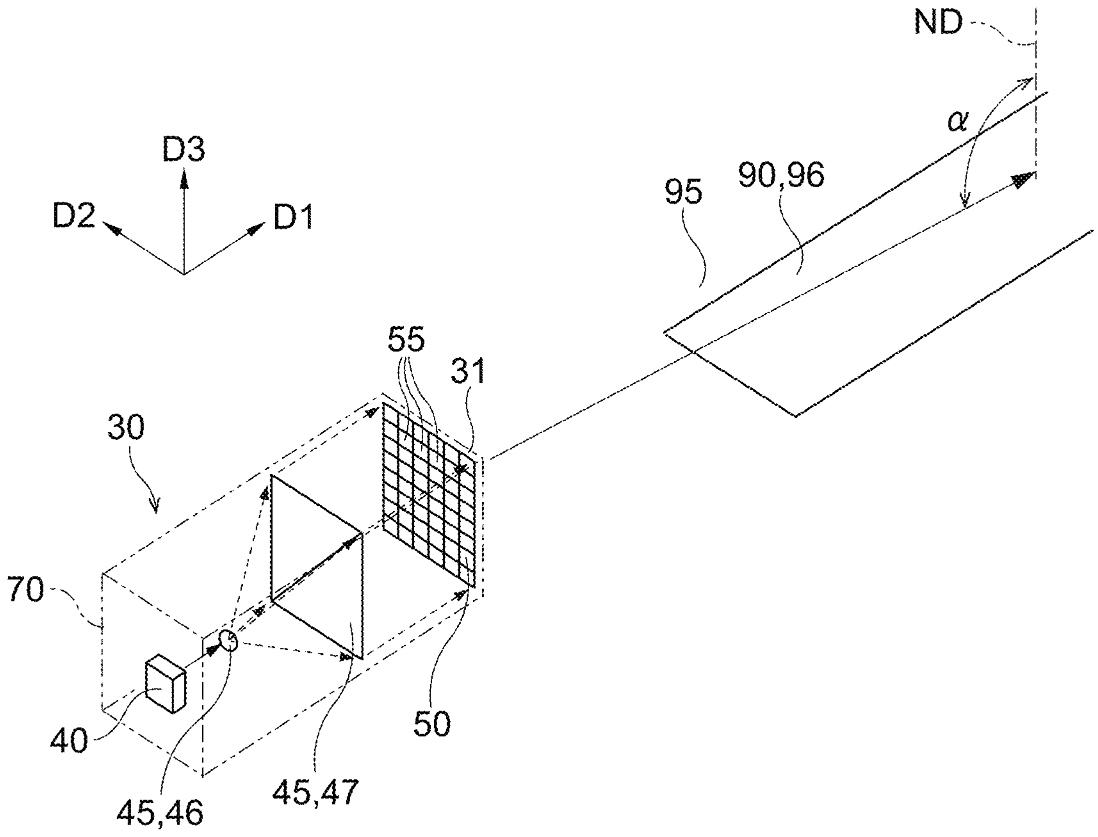
FIG. 9 is a perspective view showing another example of an illuminating device.

As shown in FIG. 9, the diffraction optical element 50 may include a plurality of elemental diffraction optical elements 55. Each elemental diffraction optical element 55 is, for example, a hologram element and can be configured in the same manner as the aforementioned diffraction optical element 50. In the example shown in FIG. 9, coherent light diffracted by the plurality of elemental diffraction optical elements 55 is shone on the same illuminated region 96. That is, light diffracted by each of the elemental diffraction optical elements 55 is shone on the whole of the illuminated region 96 on the surface of projection 95. Such a diffraction optical element 50 allows light traveling toward various positions in the illuminated region 96 to be dispersedly emitted from the plurality of elemental diffraction optical elements 55 of the diffraction optical element 50. This restrains each position on the diffraction optical element 50 from being too bright, making it possible to bring about improvement in lase safety.

The elemental diffraction optical elements 55 may be configured to be identical in diffraction characteristic to one another. Note, however, that in achieving higher-accuracy illumination, each of the elemental diffraction optical elements 55 may be given diffraction characteristics designed separately for that elemental diffraction optical element 55 according to the location of that elemental diffraction optical element 55 in the diffraction optical element 50. According to this example, each of the elemental diffraction optical elements 55 has its diffraction characteristics adjusted according to a difference in location from the other elemental diffraction optical elements 55, whereby diffracted light can be highly accurately directed solely to the whole of the illuminated region 96 on the surface of projection 95.

Incidentally, an illuminating device 30 having a light source 40 configured to emit coherent light and a diffraction optical element 50 configured to diffract the coherent light can illuminate a large-area illuminated region 96 on a surface of projection 95 or an illuminated region 96 extending to a position distant from the illuminating device 30. That is, a long and thin projected pattern 90 can be projected onto the surface of projection 95. At this point in time, there are great variations in the angle of incidence $\alpha$ of the coherent light on various positions in the illuminated region 96. The angle of incidence $\alpha$ on an illuminated region 96 far removed from the illuminating device 30 is very great, e.g. close to 90 degrees. The diffractive surface of the diffraction optical element 50 forms a great angle with respect to the surface of projection 95 and the illuminated region 96. The angle of incidence α on the illuminated region 96 here is an angle that the direction of travel of the illuminating light forms with respect to a direction ND normal to the illuminated region 96. In the illustrated example, the normal direction ND is parallel to the third direction D3 orthogonal to both the first direction D1 and the second direction D2.

In this illuminating device 30, the diffraction optical element 50 adjusts an optical path of the coherent light. The diffraction optical element 50 has a high-accuracy optical path adjustment function. Accordingly, the optical path of the coherent light can be adjusted by the diffraction optical element 50 toward an illuminated region 96 of a desired shape. This makes it possible to, without being strongly bound by a position relative to the illuminating device 30, set the illuminated region 96, for example, also in a position far removed from the illuminating device 30, a position where the angle of incidence α of the coherent light is greater, or other positions. That is, this makes it possible to significantly improve the degree of freedom in setting of the projected pattern 90 and the surface of projection 95. As a result, the coherent light can be highly accurately shone on the illuminated region 96. The projected pattern 90 can be precisely projected onto the surface of projection 95.

According to a diffraction optical element 50 composed of a computer-generated hologram as an example, the direction of travel of coherent light coming from a certain direction can be adjusted with an accuracy of ±0.01 degree in an angular space. Using such a diffraction optical element 50 makes it possible to highly accurately illuminate an illuminated region 96 located at a distance of 1 m to 120 m from the diffraction optical element 50 or such an illuminated region 96 that the angle of incidence α of the coherent light on the illuminated region 96 is at least 30 degrees or greater and at most 89.99 degrees or less. Accordingly, the illuminating device 30 can highly accurately shine the coherent light on an illuminated region 96 located on the surface of projection 95. This makes it possible to make the edges of a projected pattern 90 clear and allows an operator to view a remotely-located projected pattern 90.

FIG. 10 shows a specific example configuration of an illuminating device 30. The illuminating device 30 shown in FIG. 10 has portability. That is, the illuminating device 30 shown in FIG. 10 is able to be carried by an operator without using special means. The illuminating device 30 has a casing 70. In the illuminating device 30 shown in FIG. 10, the light source 40, the shaping optical system 45, and the diffraction optical element 50 are fixed to the casing 70. During normal use, the light source 40, the shaping optical system 45, and the diffraction optical element 50 are not intended to be removed from the casing 70. The light source 40, the shaping optical system 45, and the diffraction optical element 50 irremovable from the casing 70. This causes the relative positions of the light source 40, the shaping optical system 45, and the diffraction optical element 50 to be maintained. This makes it possible to highly accurately and stably project a projected pattern 90 onto a surface of projection 95 that is in a predetermined relative positional relationship with the illuminating device 30. This also restrains the light source 40, the shaping optical system 45, and the diffraction optical element 50 from being shifted from the predetermined positions, making it possible to bring about improvement in lase safety.

In the example shown in FIG. 10, the shaping optical system 45 includes a first lens 46, a second lens 47, and a third lens 48. The casing 70 includes a cylindrical portion 71 holding the light source 40 and the shaping optical system 45 and a lid portion 72 fixed to the cylindrical portion 71. The cylindrical portion 71 has the shape of a cylinder having one end closed. The light source 40 is fixed to the closed end of the cylindrical portion 71. The cylindrical portion 71 has an inner dimension that changes via stepped portions 71*a*. The inner diameter increases from an upstream side to a downstream side along an optical path of coherent light emitted from the light source 40. The first lend 46 and the second lens 47 are attached separately to each of these two stepped portions 71*a*. Spacing rings 73 configured to highly accurately control a lens-to-lens distance are provided in the cylindrical portion 71. A spacing ring 73 is placed between the first lens 46 and the second lens 47. A spacing ring 73 is placed between the second lens 47 and the third lens 48. Further, a spacing ring 73 is placed between the lid portion 72 and the third lens 48. The spacing rings 73 restrain a shift in the relative position of each lens due to vibration or shock that is applied to the illuminating device 30. Examples of the spacing rings 73 may be annular or cylindrical members. The spacing rings 73 may be made of metal such as aluminum or may be made of resin. An inorganic material such as fiberglass may be mixed into the resin to reduce the coefficient of thermal expansion. The spacing rings 73 make it possible to restrain a shift in the degree of parallelization of collimated light due to vibration or shock that is applied to the illuminating device 30. That is, the spacing rings 73 can restrain the projected pattern 90 from becoming blurred on the surface of projection 95. This makes it possible to keep the viewability of the projected pattern 90 high.

In order to keep the relative positions of the light source 40, the shaping optical system 45, the diffraction optical element 50, or other constituent elements constant, the light source 40, the shaping optical system 45, and the diffraction optical element 50 may be fixed to the casing 70 by fixing involving the use of an adhesive or by the combined use of insertion fixing and adhesive fixing.

In order to adjust the relative positions of the light source 40, the shaping optical system 45, the diffraction optical element 50, or other constituent elements in fine increments, for example, spacers may be used. Usable examples of the spacers may be thin plate-shaped members made of metal. The spacers may be used in combination with the spacing rings 73 and an adhesive.

Further, constituent elements such as the light source 40, the shaping optical system 45, and the diffraction optical element 50 may be held by a position adjusting holder configured to adjust the placement in fine increments. The position adjusting holder may make it possible to adjust the positions of the constituent elements in fine increments by operating an adjuster such as a screw. The constituent elements may be fixed to the casing 70 via the position adjusting holder. In a case where the position adjusting holder is used, the adjuster such as a screw may be fixed by an adhesive or other substances after the positions of the constituent elements have been adjusted. Further, the position adjusting holder may be used in combination with the aforementioned spacing rings 73 or other members configured to maintain the relative positions of constituent elements subjected to fine adjustments.

The casing 70 may be not able to be disassembled so that the relative positions of constituent elements such as the light source 40, the shaping optical system 45, and the diffraction optical element 50 may be maintained. For example, the relative positions of constituent elements positioned by a manufacturer of the illuminating device 30 may be maintained. For example, the casing 70 may be not able to be disassembled by applying an adhesive to a screwed portion or an inserted portion of the casing 70.

In the example shown in FIG. 10, the illuminating device 30 has a battery 74, a circuit 75, and a switch 76. The battery 74 may be a primary battery or may be a secondary battery that can be charged and discharged. The circuit 75 is electrically connected to the battery 74 and the switch 76. When the switch 76 is operated, the circuit 75 changes between feeding electricity from the battery 74 to the light source 40 and stopping feeding electricity from the battery 74 to the light source 40.

The illuminating device 30 may be configured to be supplied with electric power from an external power source. For example, the casing may be provided with a connector to be electrically connected to the external power source. In this example, the illuminating device 30 may include a primary battery or a secondary battery or may not include a primary battery or a secondary battery. When the illuminating device 30 does not include a primary battery or a secondary battery, the illuminating device 30 is light in weight and therefore superior in resistance against vibration or shock.

The illuminating device 30 and the casing 70 may be waterproof. In order to make the illuminating device 30 waterproof, a waterproof member such as rubber or packing may be provided in a joint portion or an inserted portion of the casing 70.

The illuminating device 30 may have a thermoregulation mechanism. The thermoregulation mechanism may keep the light source 40 and the circuit 75 at temperatures falling within a predetermined range. The thermoregulation mechanism may heat or cool the light source 40 and the circuit 75. The thermoregulation mechanism may be installed in the casing 70. Examples of the thermoregulation mechanism include a fan, a heater, and a cooler. As the thermoregulation mechanism, a heating wire, a Peltier element, or other components may be used.

Figure 11:
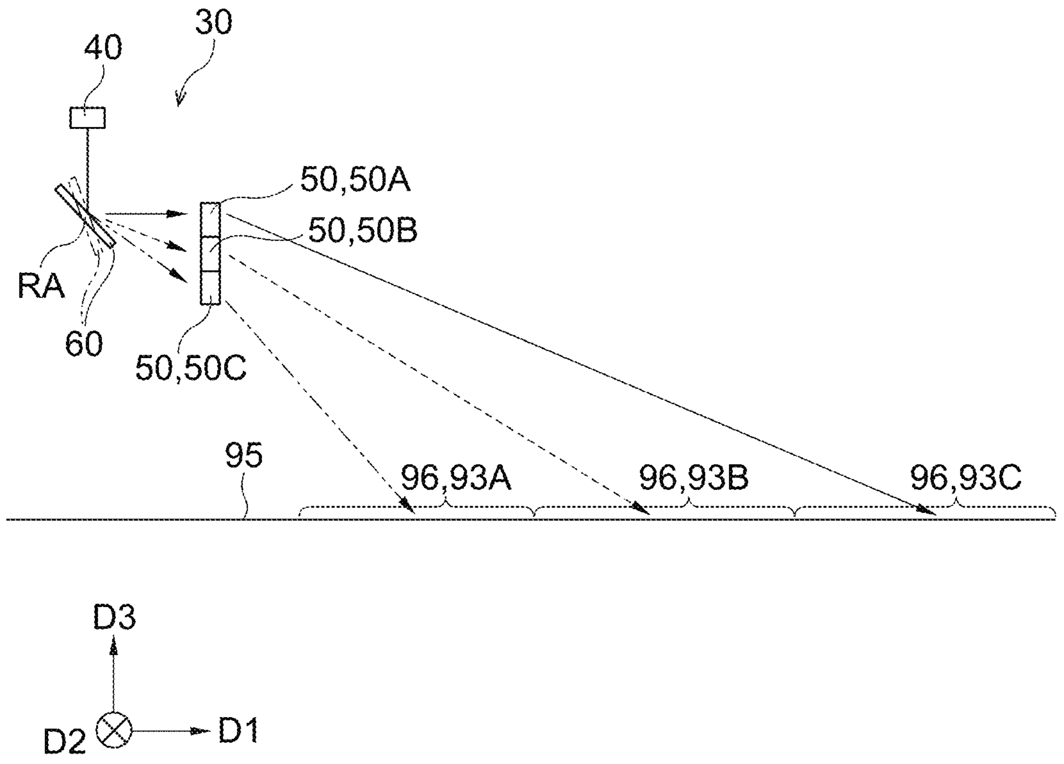
FIG. 11 is a side view showing still another example of an illuminating device.

As shown in FIG. 11, an illuminating device 30 may include a scanning device 60. The illuminating device 30 shown in FIG. 11 includes a plurality of diffraction optical elements 50A to 50C. By adjusting an optical path of coherent light emitted from the light source 40, the scanning device 60 controls the presence or absence of the supply of the coherent light to the diffraction optical elements 50 and the distribution of the coherent light to the plurality of diffraction optical elements 50A to 50C. The scanning device 60 can be constituted using various components or other parts that can change the optical path by utilizing refraction, reflection, diffraction, or other phenomena. Examples of the various components that can change the optical path include lenses, prisms, mirrors, and diffraction optical elements.

The scanning device 60 temporally changes the optical path of the coherent light from the light source 40. As a result of this, the positions of incidence of the coherent light on the plurality of diffraction optical elements 50A to 50C move. That is, the plurality of diffraction optical elements 50A to 50C replace one another as a diffraction optical element 50 on which the coherent light from the light source 40 falls. The scanning device 60 thus illustrated has a reflection surface that can rotate on one axis line RA. As such a scanning device 60, a galvanometer mirror may be used.

The illuminated region 96 may be divided into a plurality of partial regions 93A, 93B, and 93C according to locations in the first direction D1. The plurality of diffraction optical elements 50A to 50C may illuminate the different partial regions 93A, 93B, and 93C. This example makes it possible to narrow a diffraction angle range of light that is diffracted by one diffraction optical element 50. This brings about improvement in diffraction efficiency in each diffraction optical element 50. Since the scanning device 60 operates at a speed that exceeds the resolution of human vision, all of the partial regions 93A, 93B, and 93C included in the illuminated region 96 are viewed by a human as if they continue to be illuminated at the same time.

Figure 12:
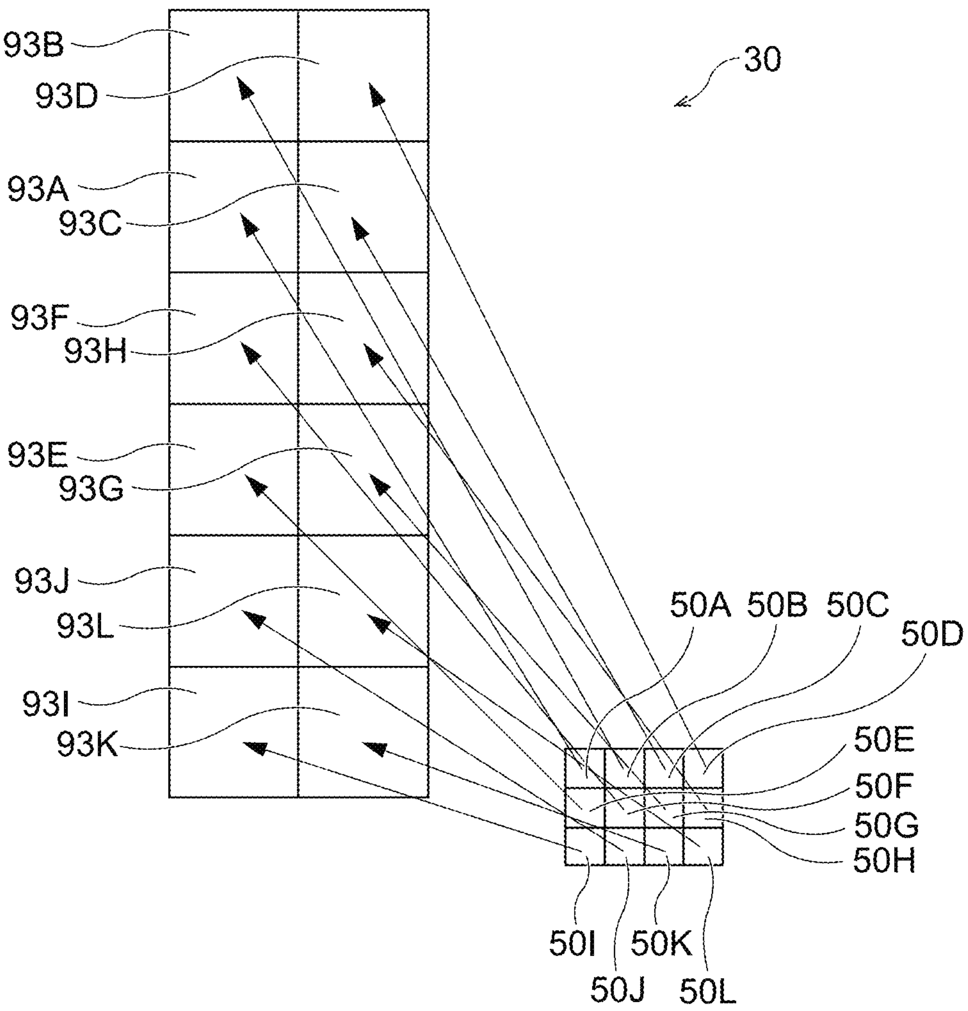
FIG. 12 is a diagram explaining still another example of an illuminating device.

In the example shown in FIG. 12, a diffraction optical element 50 includes first to twelfth diffraction optical elements 50A to 50L. For example, an illuminated region 96 on a surface of projection 95 is divided into first to twelfth partial regions 93A to 93L. Coherent light diffracted by the first to twelfth diffraction optical elements 50A to 50L is shone separately on each of the first to twelfth partial regions 93A to 93L. The scanning device 60 directs light from the light source 40 toward each of the diffraction optical elements 50A to 50L. The illuminating device 30 can control the presence or absence of the illumination of each of the diffraction optical elements 50A to 50L with light according to how the scanning device 60 operates. For example, the light source 40 changes, according to how the scanning device 60 operates, changes between emitting light and stopping emitting light. As another example, a light-shielding member configured to shield light enters or recedes from an optical path of the light from the light source 40 according to how the scanning device 60 operates. By controlling the presence or absence of the illumination of each of the diffraction optical elements 50A to 50L with light, the coherent light can be projected only onto any of the diffraction optical elements 50A to 50L. This makes it possible to illuminate only any of the first to twelfth partial regions 93A to 93L, making it possible to illuminate an area in a desired shape in the illuminated region 96.

It should be noted that each of the diffraction optical elements 50 included in the illuminating device 30 shown in FIGS. 11 and 12 may be divided into a plurality of elemental diffraction optical elements 55.

In the embodiment thus described, a projection system 10 includes an illuminating device 30 and an optical filter 120. The illuminating device 30 emits illuminating light. The illuminating device 30 projects a projected pattern 90 onto a surface of projection 95. An average transmittance of the optical filter 120 in a wavelength region of the illuminating light emitted from the illuminating device 30 is higher than an average transmittance of the optical filter 120 in a visible light wavelength region other than the wavelength region of the illuminating light. According to the present embodiment, viewing the projected pattern 90 via the optical filter 120 brings about improvement in contrast of the projected pattern 90 on the surface of projection 95. This makes it possible to clearly view the projected pattern 90.

In the embodiment thus described, a viewing assist device 100 assists viewing of a projected pattern 90 that is projected onto a surface of projection 95 with use of illuminating light emitted from an illuminating device 30. The viewing assist device 100 includes an optical filter 120. An average transmittance of the optical filter 120 in a wavelength region of the illuminating light emitted from the illuminating device 30 is higher than an average transmittance of the optical filter 120 in a visible light wavelength region other than the wavelength region of the illuminating light. The wavelength region of the illuminating light is a wavelength region ranging from a wavelength that is 5 nm lower than a peak wavelength of the illuminating light to a wavelength that is 5 nm higher than the peak wavelength. The peak wavelength of the illuminating light is a wavelength at which a maximum radiant flux of the illuminating light is attained. According to the present embodiment, viewing the projected pattern 90 via the optical filter 120 brings about improvement in contrast of the projected pattern 90 on the surface of projection 95. Accordingly, the viewing of the projected pattern 90 is assisted by the viewing assist device 100, so that the projected pattern 90 can be clearly viewed.

While the embodiment has been described with reference to specific examples, the aforementioned specific examples are not intended to limit the embodiment. The aforementioned embodiment can be carried out in other various specific examples, and various omissions, substitutions, changes, additions, or other alterations can be made without departing from the scope of the embodiment.

The following describes modifications with reference to the drawings. In the following description and the drawings that are referred to in the following description, components that may be configured in a manner similar to those of the aforementioned specific examples are given reference signs that are identical to those given to the corresponding components of the aforementioned specific examples, and a repeated description of such components is omitted.

Figure 13:
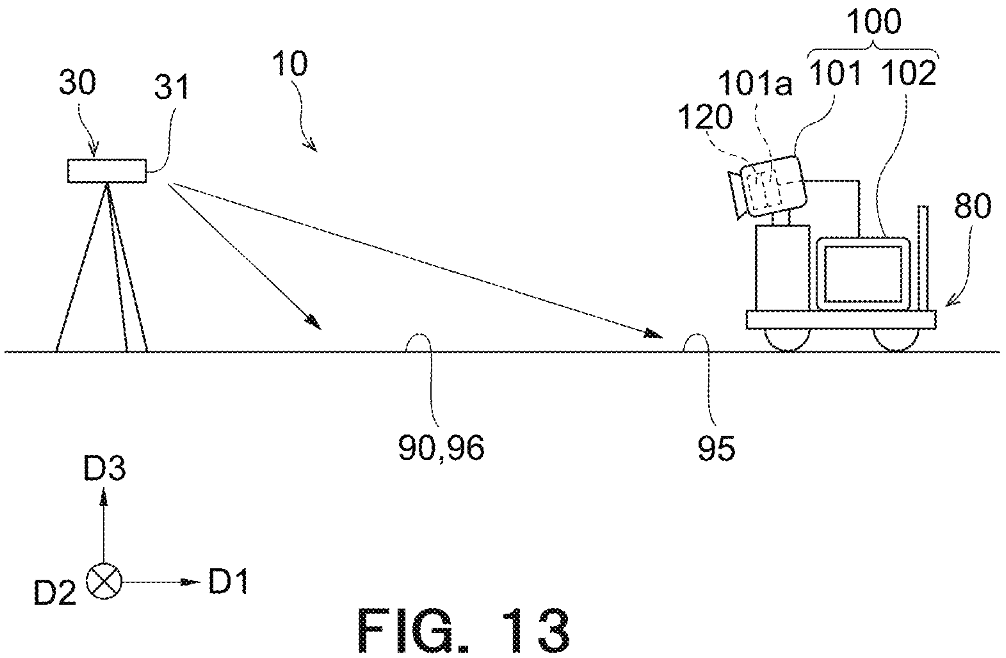
FIG. 13 is a side view showing still another example of a viewing assist device.

The aforementioned specific example has illustrated an example in which the viewing assist device 100 includes the imaging device 101 and the display device 102. As shown in FIG. 13, the imaging device 101 of the viewing assist device 100 may be mounted on the movable body 80. In a case where the projected pattern 90 that is projected onto the surface of projection 95 by the illuminating device 30 indicates a route of movement of the movable body 80, the viewer 5 can operate the movable body 80 while viewing an image that is displayed on the display device 102.

Figure 14:
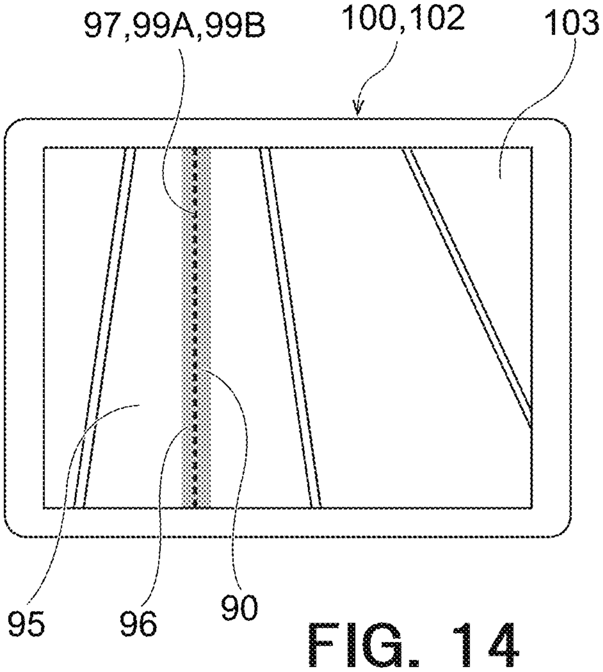
FIG. 14 is a plan view showing a display device that can be included in the viewing assist device of FIG. 13.

FIG. 14 is a plan view showing a display surface 103 of the display device 102. The imaging device 101 images a surface of projection 95 that is a road surface. A linear projected pattern 90 is projected onto the surface of projection 95. The viewer 5 can operate the movable body 80 while viewing an image displayed on the display surface 103. This allows the movable body 80 to move along a predetermined route of movement indicated by the projected pattern 90.

As shown in FIG. 14, the display device 102 may display a reference pattern 97 together with an image taken by the imaging device 101. The reference pattern 97 may indicate a predetermined position, a predetermined direction, or a predetermined range within a range that is imaged by the imaging device 101. The predetermined position, the predetermined direction, or the predetermined range may be a position, a direction, or a range on the surface of projection 95.

In the example shown in FIG. 14, the reference pattern 97 indicates a scheduled route of movement 99A of the movable body 80 in a case where the movable body 80 keeps traveling in a way it currently is. That is, the reference pattern 97 indicates a scheduled position of passage of the movable body 80 within the range imaged by the imaging device 101. The reference pattern 97 indicates a direction of movement of the movable body 80 within the range imaged by the imaging device 101.

According to the example shown in FIG. 14, causing the reference pattern 97, which indicates the scheduled route of movement 99A, and the projected pattern 90 to overlap each other on the display surface 103 of the display device 102 allows the movable body 80 to highly accurately move along the scheduled route of movement. Further, viewing an overlap between the reference pattern 97, which indicates the scheduled route of movement 99A, and the projected pattern 90 on the display surface 103 of the display device 102 makes it possible to confirm that the movable body 80 is moving along the scheduled route of movement.

It should be noted that the imaging device 101 may be attached to the movable body 80. In this example, the imaging device 101 can display an image of a region that is in a certain relative relationship with the movable body 80. In a case where the movable body 80 makes a certain movement such as traveling in a straight line, the movable body 80 passes through a certain position within the range displayed on the display device 102 of the imaging device 101. The reference pattern 97, which indicates the scheduled route of movement 99A of such a movable body 80, may be an image that is inputted as image data to the display device 102 and that is displayed on the display device 102 or may be a mark put on the display surface 103 with a writing instrument or a tape.

The movable body 80 may be a work vehicle configured to carry out some sort of work. The movable body 80 may carry out some sort of work while moving. In the example shown in FIG. 17, the movable body 80 includes a work device 84. The work device 84 can carry out predetermined work on the surface of projection 95, on which the movable body 80 travels. As mentioned above, the work device 84 may be used for line-drawing work. The line-drawing work can involve drawing a white line or an orange line on a surface of a road, a sidewalk, a parking lot, or other places on which the work is to be carried out.

In an example in which the movable body 80 is a work vehicle, the projected pattern 90 may indicate a position on the surface of projection 95 at which the work should be carried out, a direction on the surface of projection 95 in which the work should be carried out, and a region on the surface of projection 95 in which the work should be carried out. In the example shown in FIG. 14, the projected pattern 90 may be a predetermined route along which the work should be carried out.

In the example shown in FIG. 14, the reference pattern 97 may indicate a scheduled route of work 99B along which the movable body 80 carries out work in a case where the movable body 80 as a work vehicle keeps traveling in a way it currently is. That is, the reference pattern 97 may indicate a scheduled position of work by the movable body 80 within the range imaged by the imaging device 101. The reference pattern 97 may indicate a direction in which the movable body 80 proceeds with the work within the range imaged by the imaging device 101.

According to the example shown in FIG. 14, causing the reference pattern 97, which indicates the scheduled route of work 99B, and the projected pattern 90 to overlap each other on the display surface 103 of the display device 102 allows the movable body 80 to highly accurately carry out the work along the planned route of work. Further, viewing an overlap between the reference pattern 97, which indicates the scheduled route of work 99B, and the projected pattern 90 on the display surface 103 of the display device 102 makes it possible to confirm that the movable body 80 is carrying out the work along the planned route of work.

Incidentally, under some environmental conditions such as weathers, it may be hard to view a projected pattern on a surface of projection. Further, it is necessary to increase output from an illuminating device to brightly display a large-area projected pattern. This causes an emission end of the illuminating device to glare. Furthermore, in the example shown in FIG. 18A, the projected pattern 90 is in the shape of a line. The linear projected pattern 90 tends to be brightly displayed at a position on the surface of projection 95 that is close to the illuminating device 30. The linear projected pattern 90 can be darkly displayed at a position on the surface of projection 95 that is far away from the illuminating device 30. It can be hard to view the linear projected pattern 90 at a position on the surface of projection 95 that is far away from the illuminating device 30.

To address such a problem, the projection system 10 and the viewing assist device 100 may have the following configuration.

Figure 17:
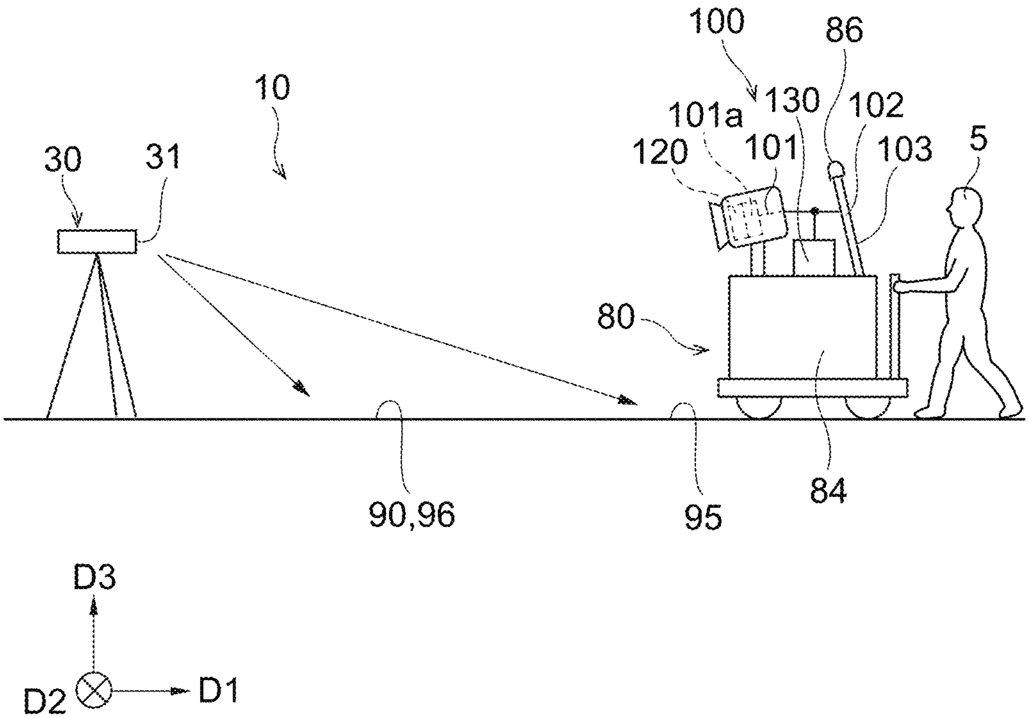
FIG. 17 is a side view showing still another example of a projection system and still another example of a viewing assist device.

As shown in FIG. 17, the projection system 10 and the viewing assist device 100 may include a control device 130 electrically connected to the imaging device 101 and the display device 102. The control device 130 detects the projected pattern 90 from the image displayed on the display device 102.

The control device 130 generates a display pattern 92 associated with the projected pattern thus detected. The display device 102 displays the display pattern 92 over the image taken by the imaging device 101.

Figure 18A:
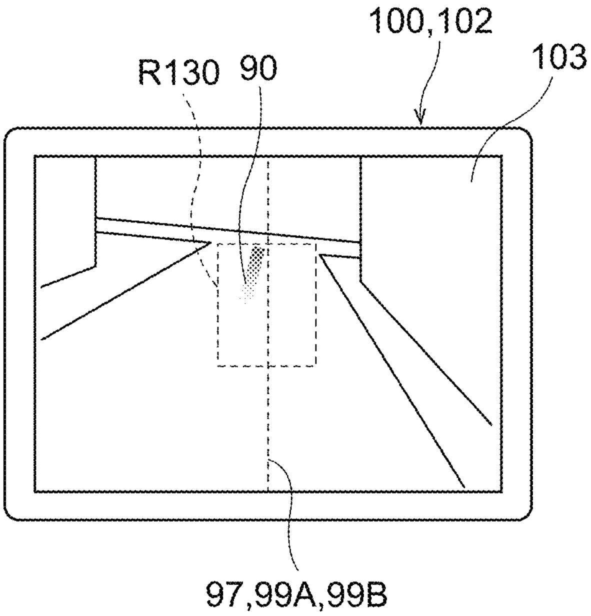
FIG. 18A is a diagram corresponding to FIG. 14 and showing a display surface of the display device.

FIG. 18A shows the display surface 103 of the display device 102 of the projection system 10 and the viewing assist device 100 shown in FIG. 17. In the example shown in FIG. 17, the illuminating device 30 projects a projected pattern 90 as a linear pattern onto the surface of projection 95. The linear pattern extends in a straight linear fashion in the first direction D1 between the illuminating device 30 and the imaging device 101.

In the examples shown in FIG. 18A and FIGS. 18B to 18E, which will be referred to later, the surface of projection 95 is a road. This road joins another road to form a T-shaped intersection. The projected pattern 90 extends in a straight linear fashion along the road from the T-shaped intersection. In the example shown in FIG. 18A, the linear projected pattern 90 is viewed in an area near the T-shaped intersection that is away from the imaging device 101.

Figure 18B:
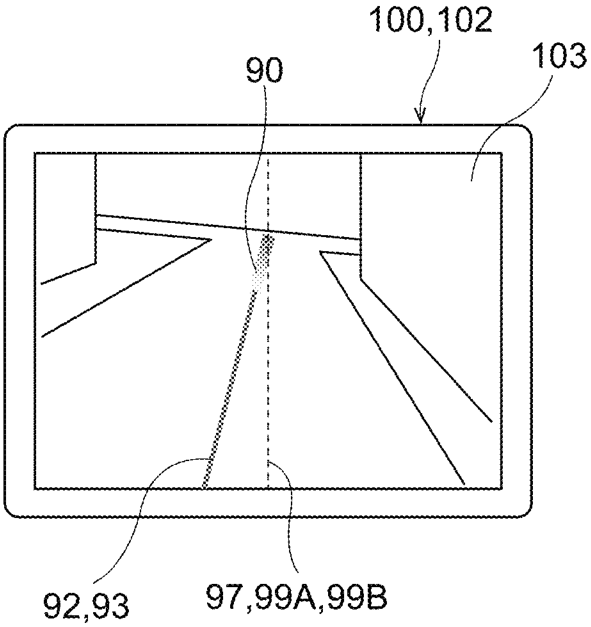
FIG. 18B is a diagram corresponding to FIG. 14 and showing the display surface of the display device.

In the example shown in FIG. 18B, the display device 102 displays a display pattern 92 over the image taken by the imaging device 101. The display pattern 92 includes a linear auxiliary pattern 93 extending as an extension of the projected pattern 80. In the example shown in FIG. 18B, the display pattern 92 is composed solely of the auxiliary pattern 93. The auxiliary pattern 93 is a straight linear pattern as is the case with the projected pattern 90.

In the example shown in FIG. 18B, the display device 102 displays the projected pattern 90 that is viewed on the display surface 103 and the auxiliary pattern 93 connected to the projected pattern 90. The projected pattern 90 and the auxiliary pattern 93 are displayed as a continuous line on the display surface 103 of the display device 102.

The display by the display device 102 of the auxiliary pattern 93 generated by the control device 130 makes it possible to clearly view the whole of the projected pattern 90 even if some environment conditions or other conditions have made it hard to view a part of the projected pattern 90. This makes it possible to stably carry out a scheduled movement or work in accordance with information indicated by the projected pattern 90.

Further, on the premise that the auxiliary pattern 93 of the display pattern 92 is used, the projected pattern 90 may be a portion of a pattern originally intended to be displayed. The illuminated region 96 may be a portion of the pattern originally intended to be displayed. In this example, on the display surface 103, the display pattern 92 is displayed in a region other than the illuminated region 96. This example makes it possible to reduce output from the illuminating device 30 and restrain an emission end 31 of the illuminating device 30 from glaring.

The control device 130 may include a central processing unit (CPU) configured to operate in accordance with a predetermined program. The control device 130 may include an input unit such as a keyboard and a mouse. The control device 130 may include a storage unit such as a ROM and a RAM. The control device 130 may include a storage device such a semiconductor drive such as an SSD. The control device 130 may include a storage unit such as a cloud server.

The control device 130 may perform wireless or wired communication with the imaging device 101. The control device 130 may acquire, from the imaging device 101, image data taken by the imaging device 101. The control device 130 may detect a projected pattern 90 using the image data acquired from the imaging device 101.

The control device 130 may perform wireless or wired communicated with the display device 102. The control device 130 may control a display content of the display device 102. The display device 102 may be a display device such as a liquid crystal display, a plasma display, or an organic EL display. The display device 102 may include a touch panel sensor configured to function as an input unit.

Figure 19:
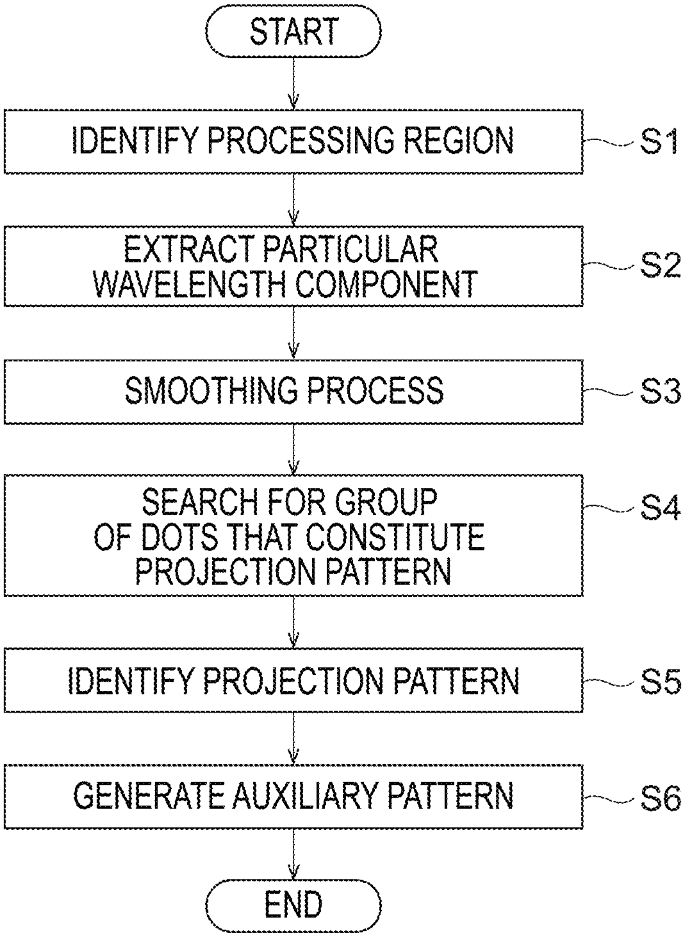
FIG. 19 is a flow chart showing an example of a method for generating a display pattern with a control device.

FIG. 19 is a flow chart regarding a process by the control device 130. The flow chart shown in FIG. 19 shows an example of a method for detecting a projected pattern 90 from an image acquired by the imaging device 101 and generating an auxiliary pattern 93 of a display pattern 92. In this example, a linear projected pattern 90 is detected, and image data representing an auxiliary pattern 93 located on an extension of the projected pattern 90 is generated.

In the example shown in FIG. 19, the auxiliary pattern 93 of the display pattern 92 is generated through steps S1 to S6.

First, in a first step S1, a processing region R130 is identified by trimming. For reductions of the amount of calculation and the duration of calculation, only image data that is displayed in some region of the display surface 103 is subjected to processing by the control device 130. This region serves as the processing region R130 (see FIG. 18A). The processing region R130 may be set in advance. The processing region R130 may be set on an as-needed basis by a viewer 5 who views the display device 102.

In a second step S2, only a particular wavelength component is extracted from the image data taken by the imaging device 101. The particular wavelength to be extracted may be in a wavelength region of illuminating light emitted from the illuminating device 30. The particular wavelength to be extracted may be in a wavelength region of 30 nm centered at a peak wavelength of the illuminating light. In a case where the image data taken by the imaging device 101 is a monochrome image, the second step S2 is not needed.

In a third step S3, the image obtained in the second step is smoothed. A Gaussian filter or other devices are used to remove a high-frequency component from the image data.

In a fourth step S4, a group of dots that constitute the projected pattern 90 are searched for. Each dot may be one pixel of the display device 102. In an example in which a straight linear projected pattern 90 is detected, a group of dots that constitute the projected pattern 90 may be searched for in the following manner.

First, a Y direction serving as a longitudinal direction and an X direction serving as a transverse direction are defined according to a pixel array of the display device 102. Pixels with a maximum luminance are selected from among a plurality of pixels arrayed in the X direction that belong to the uppermost row in the Y direction. The pixels thus selected serve as candidates for the group of dots that constitute the projected pattern 90. The luminance of a pixel is evaluated based on a gray level of the pixel.

Next, pixels with the maximum luminance are selected from among a plurality of pixels arrayed in the X direction that belong to a next row in the Y direction below the row from which the first candidates for the group of dots have been selected. An amount of shift in the X direction of the pixels thus selected and the pixels selected as the first candidates for the group of dots is compared with a column threshold set in advance. In a case where the amount of shift is less than or equal to the row threshold, the pixels thus selected are judged as candidates for the group of dots that constitute the projected pattern 90. After that, pixels with the maximum luminance are searched for from among a plurality of pixels arranged in the X direction that belong to a next row in the Y direction below the row from which the latest candidates for the group of dots have been selected.

In a case where an amount of shift in the X direction of the pixels selected as pixels with the maximum luminance and the pixels most recently selected as candidates for the group of dots is greater than the column threshold, the pixels most recently selected are not included in the candidates for the group of dots. Next, the number of pixels selected as the candidates for the group of dots, i.e. the number of rows joined together one after another in the Y direction from which the candidates for the group of dots have been obtained, is compared with a row threshold set in advance. In a case where the number of rows is greater than the row threshold, the pixels selected as the candidates for the group of dots are judged as candidates for the group of dots that constitute the projected pattern 90.

In a case where the number of rows is less than or equal to the row threshold, the pixels selected by then are eliminated from the candidates for the group of dots. Then, a search for new candidates for the group of dots from a next row in the Y direction below the row from which pixels with the maximum luminance have been most recently selected is started in the aforementioned manner.

In the foregoing way, the group of dots that constitute the projected pattern 90 is searched for. The foregoing process is carried out for each piece of image data that is taken by the imaging device 101, e.g. for each piece of image data that is acquired at 10 frames per second. As for image data failing to meet conditions for the row threshold, it is judged that there is no group of dots that constitute a projected pattern 90, i.e. that there is no projected pattern 90.

In a fifth step S5, the projected pattern 90 is identified from the group of dots that constitute the projected pattern 90. Identification of the straight linear projected pattern 90 may involve the use of the method of least squares. Identification of the straight linear projected pattern 90 may involve the use of image processing software "fitLine" of "OpenCV". The projected pattern 90 may be identified within a range of rows in the Y direction in which the group of dots that constitute the projected pattern 90 is included.

In a sixth step S6, an auxiliary pattern 93 is generated. In the fifth step, the position of the projected pattern 90 is identified as a function in an orthogonal coordinate system whose axes extend in the X direction and the Y direction. The auxiliary pattern 93 is identified as a function having a tilt that is identical to that of the projected pattern 90. The auxiliary pattern 93 is identified as a function connected to one end of the projected pattern 90. The auxiliary pattern 93 may extend to a column located at an end in the X direction or a row located at an end in the Y direction.

Thus, the position of the auxiliary pattern 93 on the image taken by the imaging device 101 is identified.

Figure 18C:
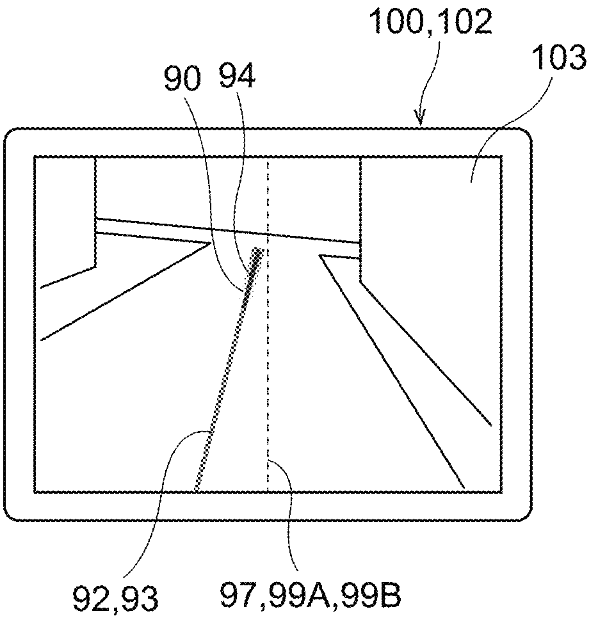
FIG. 18C is a diagram corresponding to FIG. 14 and showing the display surface of the display device.

As shown in FIG. 18C, the display pattern 92 may include a detection pattern 94. The detection pattern 94 is displayed over the projected pattern 90. That is, the detection pattern 94 is located on the projected pattern 90 thus detected. The detection pattern 94 is displayed on the illuminated region 96 in the display device 102. Such an example makes it possible to brightly view the projected pattern 90 on the display surface 103 of the display device 102 regardless of environmental conditions. This makes it possible to stably carry out a scheduled movement or work in accordance with information indicated by the projected pattern 90.

As shown in FIG. 18C, the display pattern 92 may include both the auxiliary pattern 93 and the detection pattern 94. In this example, the auxiliary pattern 93 may be connected to the detection pattern 94. The auxiliary pattern 93 may be located on an extension of the detection pattern 94. The display pattern 92 including the auxiliary pattern 93 and the detection pattern 94 makes it possible to brightly view the projected pattern 90 on the display surface 103 of the display device 102 regardless of environmental conditions. This makes it possible to stably carry out a scheduled movement or work in accordance with information indicated by the projected pattern 90.

Figure 18D:
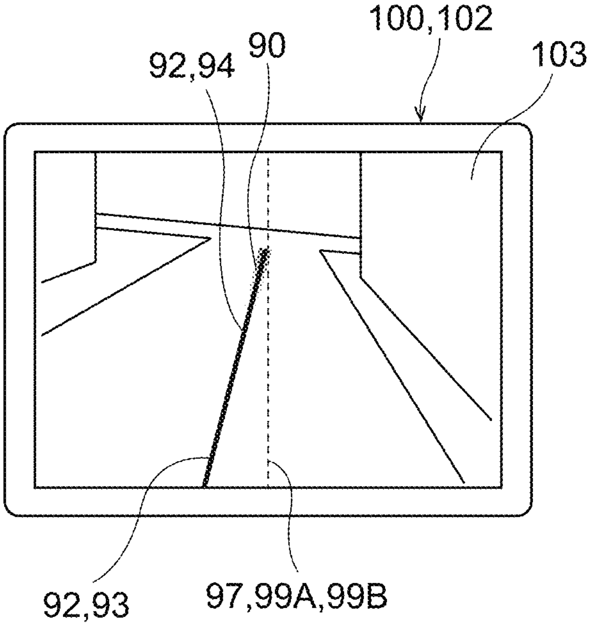
FIG. 18D is a diagram corresponding to FIG. 14 and showing the display surface of the display device.

As shown in FIG. 18C, the auxiliary pattern 93 and the detection pattern 94 may be displayed in different patterns. As shown in FIG. 18D, the auxiliary pattern 93 and the detection pattern 94 may be displayed in identical patterns. As shown in FIG. 18D, the display pattern 92 may include the auxiliary pattern 93 and the detection pattern 94 as one continuous pattern.

In each of the examples shown in FIGS. 18A to 18D, the display device 102 displays the reference pattern 97. As mentioned above, the reference pattern 97 may indicate a predetermined position, a predetermined direction, or a predetermined range within a range that is imaged by the imaging device 101. The reference pattern 97 may indicate the scheduled route of movement 99A of the movable body 80. The reference pattern 97 may indicate a scheduled position of work or a scheduled route of work 99B by the work device 84 of the movable body 80.

The control device 130 may evaluate a positional relationship between the reference pattern 97 and the projected pattern 90 thus detected. The control device 130 may evaluate a positional relationship between the reference pattern 97 and the display pattern 92 thus generated. The control device 130 may evaluate a positional relationship between the reference pattern 97 and the auxiliary pattern 93 thus generated. The control device 130 may evaluate a positional relationship between the reference pattern 97 and the detection pattern 94 thus generated.

In the aforementioned example, the position gap between each of the patterns 90, 92, 93, and 94 and the reference pattern 97 on the display surface 103 of the display device 102 means that an actual route of movement of the movable body 80, an actual position of passage of the movable body 80, an actual route of work by the movable body 80, an actual position of work by the movable body 80, or other actual routes or positions are shifted from scheduled routes and positions of movement and work.

For example, in a case where a difference in positional relationship between each of the patterns 90, 92, 93, and 94 and the reference pattern 97 in the aforementioned orthogonal coordinate system whose axes extend in the X direction and the Y direction reaches a certain level or higher, the control device 130 may determine that there is an "abnormality".

More specifically, the presence or absence of an abnormality may be evaluated by whether a difference or ratio in tilt between two patterns that are compared with each other falls within a predetermined range. The presence or absence of an abnormality may be evaluated by whether a difference in X coordinate between the Y coordinates of two patterns that are compared with each other falls within a predetermined range. The presence or absence of an abnormality may be evaluated by whether a difference in Y coordinate between the X coordinates of two patterns that are compared with each other falls within a predetermined range. The presence or absence of an abnormality may be evaluated by whether a sum of a difference in X coordinate between the Y coordinates of two patterns that are compared with each other and a difference in Y coordinate between the X coordinates of the two patterns falls within a predetermined range. The presence or absence of an abnormality may be evaluated by the distance between two patterns that are compared with each other.

Figure 18E:
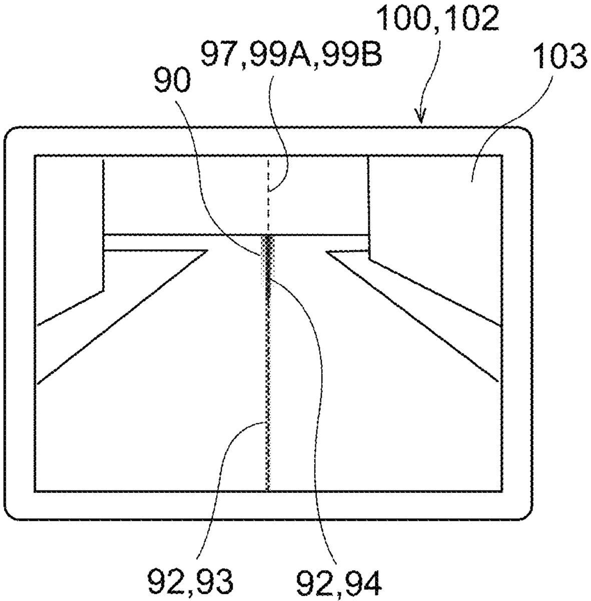
FIG. 18E is a diagram corresponding to FIG. 14 and showing the display surface of the display device.

In a case where the control device 130 determines that there is an abnormality in the positional relationship between the pattern 90, 92, 93, or 94 thus detected or generated and the reference pattern 97, the control device 130 may notify the abnormality. Notifying the abnormality facilitates a correction in position and orientation of the movable body 80. For example, as shown in FIG. 18E, the position and orientation of the movable body 80 is corrected so that the pattern 90, 92, 93, or 94 thus detected or generated and the reference pattern 97 overlap each other. This enables the movable body 80 to move or carry out work in accordance with information displayed by the projected pattern 90.

The control device 130 may notify the viewer 5 of an abnormality, for example, by a display or a sound that is outputted from the display device 102. For example, at the time of an abnormality, a method for displaying an image taken by the imaging device 101 may be changed. At the time of an abnormality, a method for displaying the display pattern 92 on the imaging device 101 may be changed. At the time of an abnormality, a method for displaying the reference pattern 97 on the imaging device 101 may be changed. The control device 130 may display a warning on the display device 102.

As shown in FIG. 17, the projection system 10 and the viewing assist device 100 may include a notification device 86 configured to notify an abnormality. The notification device 86 may be a lamp or a beeper. In a case where the control device 130 determines that there is an abnormality in the positional relationship, the notification device 86 may notify the abnormality using at least either light or a sound.

The control device 130 may notify an abnormality by changing a method for projecting the projected pattern 90 onto the surface of projection 95. In this example, the control device 130 is electrically connected to the illuminating device 30. Upon detecting an abnormality, the control device 130 may send a control signal to the illuminating device 30 by wire or radio to change the method for projecting the projected pattern 90. The change of the projecting method may be one or more of a change of the projected pattern, a change of the wavelength region of the illuminating light, and switching between glowing and blinking.

In the example shown in FIG. 17, the movable body 80 is moved by the viewer 5 pushing the movable body 80. The work device 84 carries out work on the surface of projection 95 while the movable body 80 is moving. The movable body 80 is not limited to the aforementioned work vehicle configured to draw a line on the surface of projection 95. Further, the movable body 80 may move with the viewer 5 on board.

The movable body 80 may be a work vehicle configured to make a road or a sidewalk, may be a work vehicle configured to maintain a road or a sidewalk, may be a work vehicle configured to carry out farm work, or may be a work vehicle configured to plow fields. Examples of the movable body 80 configured to make or maintain a road or a sidewalk include a grader, an asphalt finisher, a road roller, a tire roller, a wheel loader, a truck mixer, a line-drawing vehicle, a snowplow, and a garbage truck. Examples of the movable body 80 configured to carry out farm work or plow fields include a rice transplanter, a reaper, a mower, a tractor, a chemical sprayer, and a cultivator. The movable body 80 may be a special-purpose vehicle or an industrial vehicle designated in ISO 5053-1.

Figure 20:
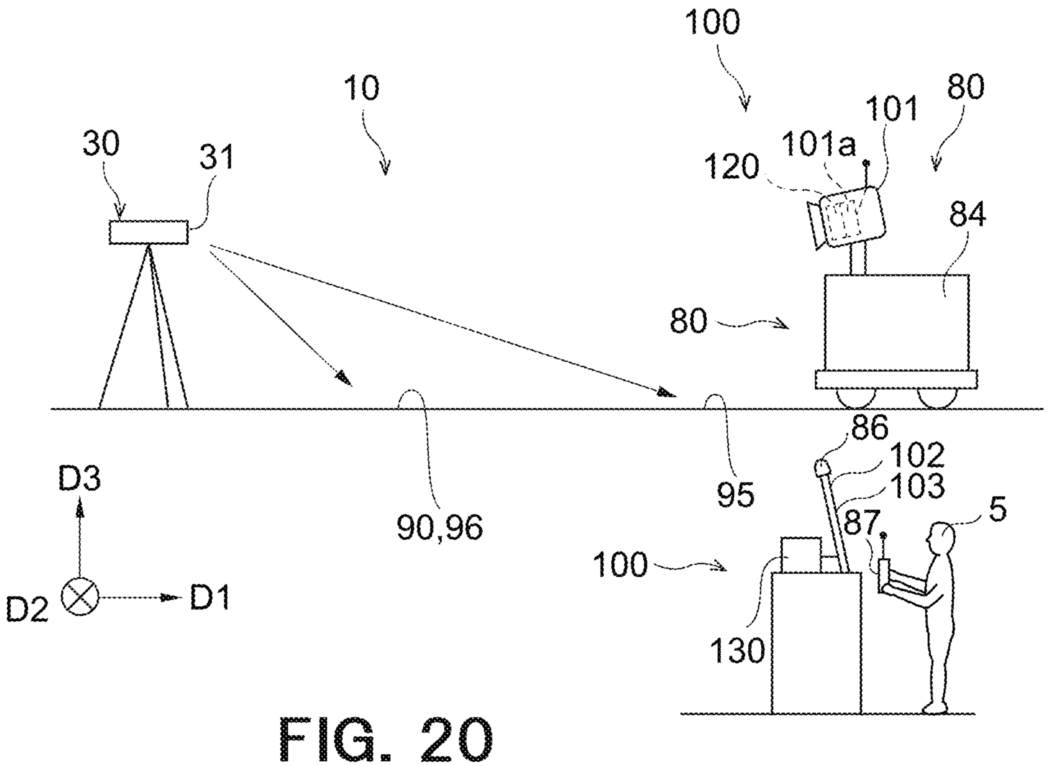
FIG. 20 is a side view showing still another example of a projection system and still another example of a viewing assist device.
Figure 21:
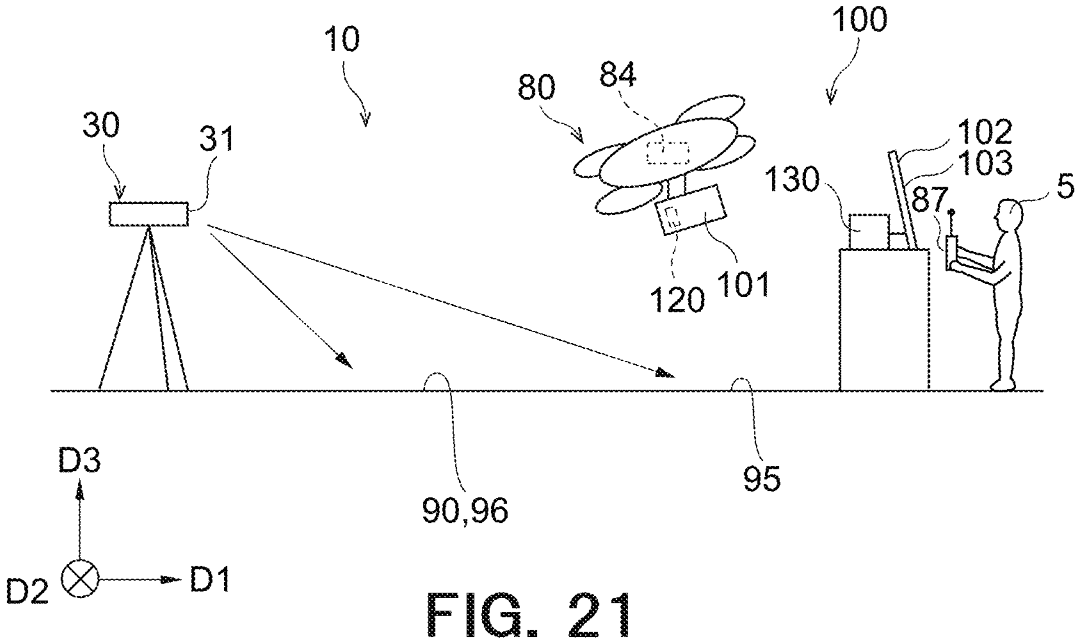
FIG. 21 is a side view showing still another example of a projection system and still another example of a viewing assist device.

As shown in FIG. 20, the viewer 5 may operate the movable body 80 using a remote controller 87 while viewing the display device 102. As mentioned above, the movable body 80 may be a train, an airplane, a ship, or, as shown in FIG. 21, a drone. In the example shown in FIG. 21, the movable body 80 as a drone may include a work device 84. The work device 84 that is mounted on the movable body 80 as a drone may be a spray device.

Figure 22:
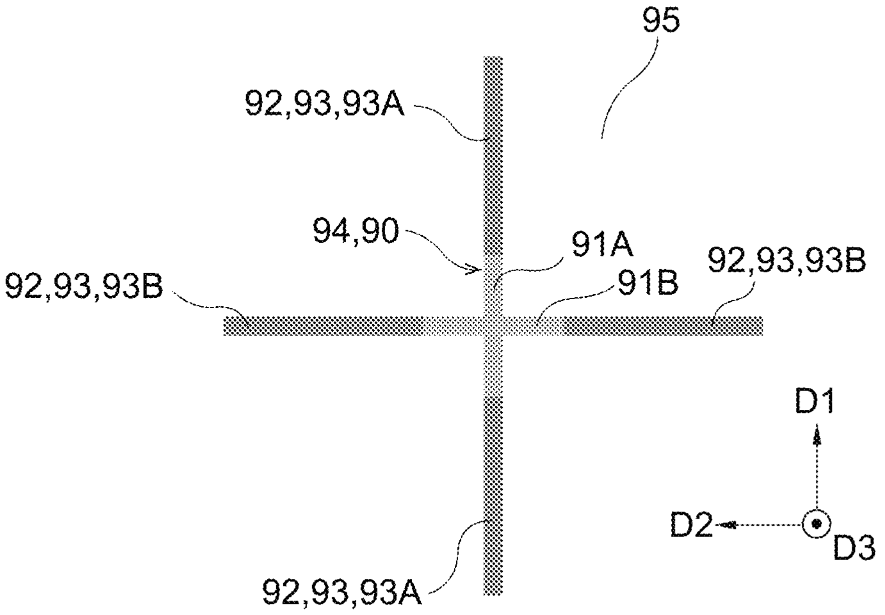
FIG. 22 is a plan view showing a modification of a projected pattern and a modification of a display pattern.
Figure 23:
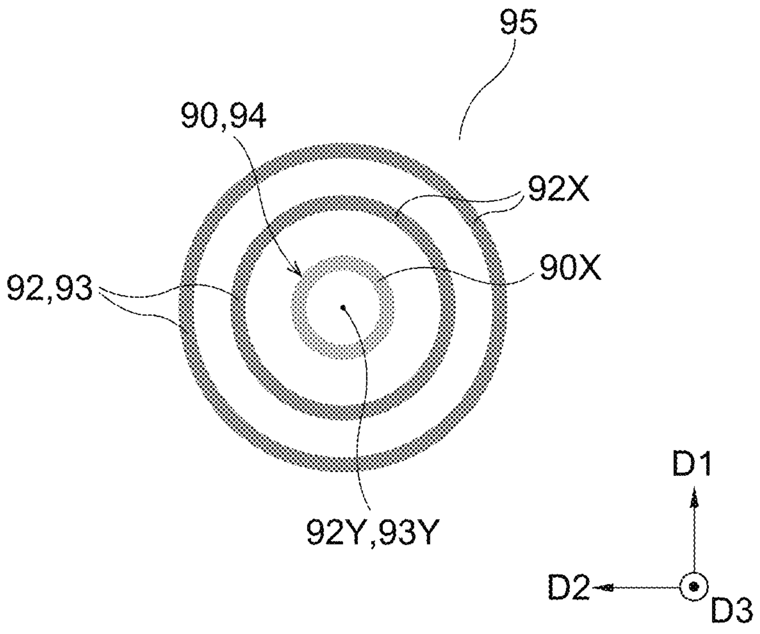
FIG. 23 is a plan view showing another modification of a projected pattern and another modification of a display pattern.

The projected pattern 90 is not limited to a straight linear pattern. As mentioned above, the projected pattern 90 is able to be changed. FIGS. 22 and 23 show modifications of projected patterns 90 and display patterns 92.

As shown in FIG. 22, the projected pattern 90 may include a first linear pattern 91A and a second linear pattern that intersect each other. The first linear pattern 91A and the second linear pattern 91B may be orthogonal to each other. The projected pattern 90 may be a cross mark. With a point of intersection of the first linear pattern 91A and the second linear pattern 91B, the projected pattern 90 may indicate an objective point of movement that should be finally reached or may indicate the center of a place in which the work should be carried out.

In the example shown in FIG. 22, the display pattern 92 includes a first auxiliary pattern 93A and a second auxiliary pattern 93B. The first auxiliary pattern 93A is located on an extension of the first linear pattern 91A. A pair of the first auxiliary patterns 93A extend out from both ends of the first linear pattern 91A. The second auxiliary pattern 93B is located on an extension of the second linear pattern 91B. A pair of the second auxiliary patterns 93B extend out from both ends of the second linear pattern 91B. A combination of the projected pattern 90 and the display pattern 92 indicates a large cross mark. The display pattern 92 of the display pattern 92 may be combined with the projected pattern 90 to indicate a region in which the work should be carried out.

In the example shown in FIG. 23, the projected pattern 90 is a linear pattern extending in a circle. The projected pattern 90 may indicate the center of a region in which the work should be carried out. Unlike in the example shown in FIG. 23, the projected pattern 90 may be in the shape of a line extending in an ellipse, may be in the shape of a line extending along the contours of a triangle, may be in the shape of a line extending along the contours of a quadrangle, or may be in the shape of a line extending along the contours of a polygon such as a pentagon or a hexagon. The projected pattern 90 may be in the shape of a circle, may be in the shape of a triangle, may be in the shape of a quadrangle, or may be in the shape of a polygon such as a pentagon or a hexagon.

In the example shown in FIG. 23, the display pattern 92 includes an auxiliary pattern 93 circumferentially surrounding the projected pattern 90. The auxiliary pattern 93 may be adjacent to the projected pattern 90. The auxiliary pattern 93 may be spaced from the projected pattern 90 as in the case of the illustrated example. The auxiliary pattern 93 spaced from the projected pattern 90 may be in the shape of a line. The auxiliary pattern 93 of the display pattern 92 may be combined with the projected pattern 90 to indicate a region in which the work should be carried out.

A center of gravity 93Y of a region surrounded by an outer contour 93X of the auxiliary pattern 93 may be in a position that is identical to that of at least either a center of gravity 90Y of the projected pattern 90 or a center of gravity 90Y of a region surrounded by an outer contour 90X of the projected pattern 90. In the example shown in FIG. 23, the display pattern 92 includes auxiliary patterns 93 extending along two circles arranged concentrically with the projected pattern 90. As is the case with the projected pattern 90, each of the auxiliary patterns 93 may be in the shape of a line extending in an ellipse, may be in the shape of a line extending along the contours of a triangle, may be in the shape of a line extending along the contours of a quadrangle, or may be in the shape of a line extending along the contours of a polygon such as a pentagon or a hexagon.

Figure 24:
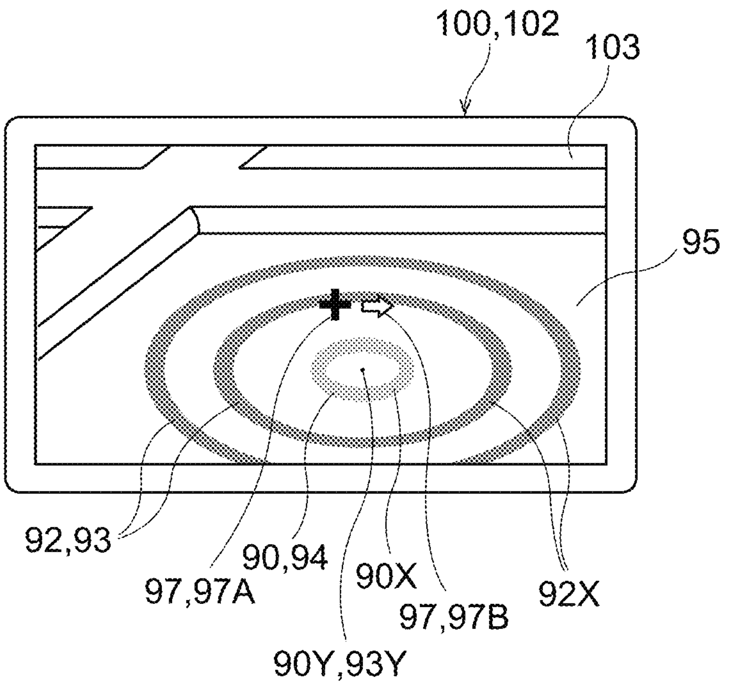
FIG. 24 is a diagram corresponding to FIG. 14 and showing the display surface of the display device.

FIG. 24 shows the display surface 103 of the display device 102. The display device 102 displays an image taken by the imaging device 101. The projected pattern 90 shown in FIG. 23 is projected in a range of imaging of the imaging device 101. The display device 102 displays the auxiliary patterns 93 of the display pattern 92 over an image including the projected pattern 90. The display device 102 occupies the reference pattern 97 over the image including the projected pattern 90. The reference pattern 97 is a cross mark.

In the specific example shown in FIG. 24, the surface of projection 95 onto which the projected pattern 90 is projected is a field where crops are grown. Assume that a spaying substance such an agricultural chemical or a fertilizer is sprayed onto a predetermined spray region of this field. In this assumption, the projected pattern 90 may indicate the center of the spray region. The auxiliary patterns 93 of the display pattern 92 may indicate a range of the spray region.

The reference pattern 97 may indicate, according to the orientation of a nozzle through which the spraying substance is ejected, a position onto which the spraying substance is sprayed. That is, the reference pattern 97 may indicate, according to the orientation of the nozzle, a scheduled position onto which the spraying substance is sprayed. In this example, the imaging device 101 may be attached to the nozzle. In this example, the reference pattern 97 may be generated by the control device 130 based on a state of the work device 84.

The reference pattern 97 may include a first reference pattern 97A and a second reference pattern 97B. In the example shown in FIG. 25, the first reference pattern 97A is a cross mark that indicates a scheduled position of spraying. The second reference pattern 97B is an arrow that indicates a direction in which the scheduled position of spraying moves. The direction of movement of the scheduled position of spraying as indicated by the second reference pattern 97B may be identified by a process in the control device 130 based on operation information of the nozzle through which the spraying substance is ejected.

As mentioned above, the control device 130 detects the pattern 90 in the image displayed on the display device 102 and generates a display pattern 92 associated with the pattern thus detected. The display device 102 displays the display pattern 92 over the image. The viewing assist device 100 including such a control device 130 and the display device 102 is applicable to a pattern other than the projected pattern that is projected from the illuminating device 30. For example, the viewing assist device 100 including the display device 102 and the control device 130 is also applicable to viewing of a pattern drawn with paint on a surface.

A display device 102 configured to display an image taken by an imaging device 101 including no optical filter 120 and a control device 130 may be combined with each other. Also in this example, a display pattern 92 can be displayed over the image by the control device 130 detecting a pattern from the image.

REFERENCE SIGNS LIST

D1 first direction
D2 second direction
D3 third direction
5 viewer
10 projection system
30 illuminating device
31 emission end
40 light source
45 shaping optical system
46 first lens
47 second lens
48 third lens
50 diffraction optical element
55 elemental diffraction optical element
60 scanning device
70 casing
71 cylindrical portion
71*a* stepped portion
72 lid portion
73 spacing ring
74 battery
75 circuit
76 switch
80 movable body
81 windshield
82 partitioning member
84 work device
86 notification device
90 projected pattern
92 display pattern
93 auxiliary pattern
94 detection pattern
95 surface of projection
96 illuminated region
97 reference pattern
100 viewing assist device
101 imaging device
101*a* imaging element
102 display device
104 wearable tool
105 light-shielding wall portion
106 frame
106A frame body
106B holding portion
107 wearable tool body
108 contact lens body
120 optical filter
121 substrate
122 dielectric multilayer film
122*a* low-refractive-index layer

122*b* high-refractive-index layer
130 control device

The invention claimed is:

1. A projection system comprising:

an illuminating device configured to emit illuminating light and project a projected pattern onto a surface of projection; and an optical filter configured such that an average transmittance of the optical filter in a wavelength region of the illuminating light is higher than an average transmittance of the optical filter in a visible light wavelength region other than the wavelength region of the illuminating light, wherein the wavelength region of the illuminating light is a wavelength region ranging from a wavelength that is 5 nm lower than a peak wavelength of the illuminating light to a wavelength that is 5 nm higher than the peak wavelength, and the peak wavelength of the illuminating light is a wavelength at which a maximum radiant flux of the illuminating light is attained.

2. The projection system according to claim 1, further comprising a wearable tool that a viewer of the projected pattern is able to wear, wherein the wearable tool includes the optical filter, and in a state where the viewer is wearing the wearable tool, the optical filter faces eyes of the viewer.

3. The projection system according to claim 2, wherein the wearable tool includes a light-shielding wall portion located around the optical filter, and in a state where the viewer is wearing the wearable tool, the light-shielding wall portion is located between the optical filter and the viewer.

4. The projection system according to claim 1, wherein the optical filter constitutes a windshield of a movable body.

5. The projection system according to claim 1, further comprising an imaging device including the optical filter.

6. The projection system according to claim 5, further comprising a display device electrically connected to the imaging device, wherein the display device displays an image taken by the imaging device.

7. The projection system according to claim 6, wherein the display device includes a wearable tool that a viewer is able to wear and a display element held by the wearable tool and configured to display the image, and in a state where the viewer is wearing the wearable tool, the display element faces eyes of the viewer.

8. The projection system according to claim 7, wherein a total transmittance of the display element is 1% or higher.

9. The projection system according to claim 6, further comprising a control device electrically connected to the imaging device and the display device, wherein the control device detects the projected pattern in the image displayed on the display device and generates a display pattern associated with the projected pattern thus detected, and the display device displays the display pattern over the image.

10. The projection system according to claim 9, wherein the projected pattern includes a linear pattern, and the display pattern includes a linear auxiliary pattern extending as an extension of the projected pattern.

11. The projection system according to claim 9, wherein the display pattern includes an auxiliary pattern circumferentially surrounding the projected pattern.

12. The projection system according to claim 9, wherein the display pattern includes a detection pattern overlapping the projected pattern thus detected.

13. The projection system according to claim 9, wherein the display device displays, over the image, a reference pattern indicating a predetermined position, a predetermined direction, or a predetermined range within a range that is imaged by the imaging device, the control device evaluates a positional relationship between the reference pattern and at least either the projected pattern thus detected or the display pattern thus generated, and in a case where the control device determines that there is an abnormality in the positional relationship, the abnormality is notified.

14. The projection system according to claim 6, wherein the imaging device is able to move relative to the surface of projection, and the display device displays, over the image, a reference pattern indicating a predetermined position, a predetermined direction, or a predetermined range within a range that is imaged by the imaging device.

15. The projection system according to claim 14, further comprising a movable body that is able to move relative to the surface of projection, wherein the imaging device is held by the movable body.

16. The projection system according to claim 1, wherein an average transmittance of the optical filter in a visible light wavelength region other than a wavelength region of 30 nm centered at the peak wavelength of the illuminating light is 1% or lower.

17. The projection system according to claim 1, wherein an illuminance LX (lx) that is a maximum value of an illuminance of the projected pattern projected onto the surface of projection, an illuminance LY (lx) attributed to ambient light at a position on the surface of projection at which the illuminance LX is attained, an average transmittance TX (%) of the optical filter in the wavelength region of the illuminating light, and an average transmittance TY (%) of the optical filter in a visible light wavelength region other than a wavelength region of 30 nm centered at the peak wavelength of the illuminating light satisfy $0.001 \leq (LX \cdot TX)/(LY \cdot TY)$.

18. The projection system according to any one of claim 1, wherein the illuminating device includes a light source configured to emit coherent light as the illuminating light and a diffraction optical element configured to diffract the coherent light.

19. The viewing assist device according to claim 1, further comprising a control device electrically connected to the imaging device, wherein the control device detects the projected pattern in the image displayed on the imaging device and generates a display pattern associated with the projected pattern thus detected.

20. A viewing assist device configured to assist viewing of a projected pattern that is projected onto a surface of projection with use of illuminating light emitted from an illuminating device, the viewing assist device comprising an optical filter configured such that an average transmittance of the optical filter in a wavelength region of the illuminating light is higher than an average transmittance of the optical filter in a visible light wavelength region other than the wavelength region of the illuminating light, wherein the wavelength region of the illuminating light is a wavelength region ranging from a wavelength that is 5 nm lower than a peak wavelength of the illuminating light to a wavelength that is 5 nm higher than the peak wavelength, and the peak wavelength of the illuminating light is a wavelength at which a maximum radiant flux of the illuminating light is attained.

* * * * *